(12) United States Patent
Nishikawa et al.

(10) Patent No.: US 11,415,081 B2
(45) Date of Patent: Aug. 16, 2022

(54) MULTI-PULSE GAS GENERATOR DEVICE AND IGNITER WITH VARIED FLOW RATES

(71) Applicant: MITSUBISHI HEAVY INDUSTRIES, LTD., Tokyo (JP)

(72) Inventors: Seiki Nishikawa, Tokyo (JP); Chiyako Mihara, Tokyo (JP); Tasuku Suzuki, Tokyo (JP); Katsunori Ieki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/176,418

(22) Filed: Feb. 16, 2021

(65) Prior Publication Data
US 2021/0293205 A1 Sep. 23, 2021

(30) Foreign Application Priority Data

Mar. 17, 2020 (JP) .............................. JP2020-046128

(51) Int. Cl.
*F02K 9/28* (2006.01)
*F02K 9/62* (2006.01)
(Continued)

(52) U.S. Cl.
CPC .................. *F02K 9/28* (2013.01); *F02K 9/40* (2013.01); *F02K 9/62* (2013.01); *F02K 9/70* (2013.01); *F02K 9/97* (2013.01); *F23Q 11/06* (2013.01)

(58) Field of Classification Search
CPC ..... F02K 9/10; F02K 9/18; F02K 9/28; F02K 9/94; F02K 9/95; B60R 21/26
(Continued)

(56) References Cited

U.S. PATENT DOCUMENTS 3,248,873 A * 5/1966 Pase .......................... F02K 9/95
60/256
7,188,567 B1 * 3/2007 Italiane ................. B60R 21/264
102/367
(Continued)

FOREIGN PATENT DOCUMENTS

JP 4719182 7/2011
JP 5602094 10/2014
(Continued)

OTHER PUBLICATIONS

Wikipedia, Reinforced Rubber, Aug. 5, 2012, Wikipedia (Year: 2012).*

*Primary Examiner* — Todd E Manahan
*Assistant Examiner* — Kyle Robert Thomas
(74) *Attorney, Agent, or Firm* — Wenderoth, Lind & Ponack, L.L.P.

(57) ABSTRACT

A multi-pulse gas generator includes a pressure vessel, first and second propellants, a barrier membrane that separates the first propellant and the second propellant, an igniter device that produces combustion gas of igniter charge, and an igniter charge combustion gas exhaust device having exhaust holes configured to exhaust the combustion gas of the igniter charge against the second propellant. The barrier membrane includes: a concavely-deformable portion; and a convexly-deformable portion. A flow rate of the combustion gas of the igniter charge exhausted against a portion of the second propellant located outside of the concavely-deformable portion is larger than that of the combustion gas of the igniter charge exhausted against a portion of the second propellant located outside of the convexly-deformable portion.

20 Claims, 17 Drawing Sheets

(51) Int. Cl.
  *F23Q 11/06*  (2006.01)
  *F02K 9/70*   (2006.01)
  *F02K 9/97*   (2006.01)
  *F02K 9/40*   (2006.01)

(58) Field of Classification Search
  USPC .................. 102/530, 531; 280/736, 741, 742
  See application file for complete search history.

(56) References Cited

U.S. PATENT DOCUMENTS

| | | |
|---|---|---|
| 8,397,486 B2 | 3/2013 | Mihara et al. |
| 9,702,320 B2 | 7/2017 | Mihara et al. |
| 10,247,139 B2 | 4/2019 | Suzuki et al. |
| 2013/0111874 A1* | 5/2013 | Kawadu ................. F02K 9/08 60/256 |
| 2013/0118147 A1* | 5/2013 | Mihara ................. F02K 9/28 60/256 |
| 2016/0115905 A1* | 4/2016 | Suzuki ................. F02K 9/12 60/204 |

FOREIGN PATENT DOCUMENTS

| | | | |
|---|---|---|---|
| JP | 2017-85021 W | * 6/2016 | ............... F02K 9/26 |
| JP | 2017-218952 | 12/2017 | |
| JP | 6360418 | 7/2018 | |

\* cited by examiner

C-C Section

A-A Section

MULTI-PULSE GAS GENERATOR DEVICE AND IGNITER WITH VARIED FLOW RATES

CROSS REFERENCE

This application claims priority of Japanese Patent Application No. 2020-046128, filed on Mar. 17, 2020, the disclosure of which is incorporated herein by reference.

TECHNICAL FIELD

The present invention relates to multi-pulse gas generator devices.

BACKGROUND ART

A multi-pulse gas generator device configured to produce thrust through fuel combustion may be used in a rocket motor.

Japanese patent application publication No. 2017-218952 A discloses an igniter configured to ignite solid fuel of a rocket motor. The disclosed igniter includes a toroidal-shaped igniting charge and a plurality of circumferentially-arranged exhaust holes through which combustion gas produced from the igniting charge are exhausted. The plurality of exhaust holes are arranged with even intervals for an arrangement in which the number of the exhaust holes is odd and with uneven intervals for an arrangement in which the number of the exhaust holes is even.

Japanese Patent Gazette No. 4719182 B2 discloses a two-pulse rocket motor. The disclosed two-pulse rocket motor includes: a second propellant installed on an inner surface of a pressure vessel; a second igniter device disposed on an end face of the second propellant; a barrier membrane that covers the entire initial combustion face of the second propellant and the second igniter device; and a first propellant loaded to cover the entirety of the barrier membrane. The first propellant and the second propellant are both shaped as an internal burning type propellant or an internal-end-burning type propellant, where the internal-end-burning type means the combustion type that uses both the internal burning and the end burning. The barrier membrane includes an inner barrier membrane that covers the inner face of the second propellant and an aft barrier membrane that covers the aft face of the second propellant. The end portions on which the aft barrier membrane and the inner barrier membrane meet each other are coupled along the entire circumference.

Japanese Patent Gazette No. 6360418 B2 discloses a gas generator that may be used as a two-pulse rocket motor. The disclosed gas generator includes: a pressure vessel; an outer propellant of a tubular shape; an inner propellant disposed inside of the outer propellant; a barrier membrane that separates the outer propellant and the inner propellant; a first igniter device that ignites the inner propellant; and a second igniter device that ignites the outer propellant. The inner propellant has a forward end face and a side face, where the forward end face faces a combustion space in the pressure vessel. The side face of the inner propellant is separated from the combustion space. The barrier membrane includes a first barrier membrane that covers a forward end face of the outer propellant; and a second barrier membrane coupled to the first barrier membrane via a weakened portion to cover the inner face and the forward end face of the outer propellant. The end portions of the first barrier membrane and the second barrier membraned are coupled to each other over the entire circumference. The weakened portion faces the combustion space and the forward end face of the outer propellant.

Japanese Patent Gazette No. 5602094 B2 discloses a multi-pulse rocket motor in which multiple pulse units are connected in series. Two or more of the plurality of pulse units other than the initial-stage pulse unit each include a barrier membrane that covers an igniter device and propellant.

SUMMARY

In view of the above-described situations, one of objectives of the present disclosure is to provide multi-pulse gas generator devices configured to stably supply propellant combustion gas. Other objectives would be understood from the following disclosure and embodiments.

In one or more embodiments, a multi-pulse gas generator device includes a pressure vessel, a barrier membrane, a first propellant, a second propellant, an igniter device, and an igniter charge combustion gas exhaust device. The first propellant and the second propellant are disposed in the pressure vessel. The barrier membrane is configured to separate the first propellant and the second propellant. The igniter device is configured to produce combustion gas of igniter charge to ignite the second propellant. The igniter charge combustion gas exhaust device has at least one exhaust hole through which the produced combustion gas of the igniter charge is exhausted against the second propellant. The barrier membrane includes a plurality of concavely-deformable portions configured to be concavely deformed by a pressure caused by combustion gas of the second propellant and/or the combustion gas of the igniter charge; and a plurality of convexly-deformable portions configured to be convexly deformed by the pressure caused by the combustion gas of the second propellant and/or the combustion gas of the igniter charge. The flow rate of the combustion gas of the igniter charge exhausted against a portion of the second propellant disposed outside of one of the plurality of concavely-deformable portions is larger than that of the combustion gas of the igniter charge exhausted against a portion of the second propellant disposed outside of one of the plurality of convexly-deformable portions.

In one or more embodiments, a multi-pulse gas generator device includes a pressure vessel, a barrier membrane, a first propellant, a second propellant, an igniter device, and an igniter charge combustion gas exhaust device. The first propellant and the second propellant are disposed in the pressure vessel. The barrier membrane is configured to separate the first propellant and the second propellant. The igniter device is configured to produce combustion gas of igniter charge to ignite the second propellant. The igniter charge combustion gas exhaust device has at least one exhaust hole through which the produced combustion gas of the igniter charge is exhausted against the second propellant. The barrier membrane includes: a plurality of concavely-deformable portions configured to be concavely deformed by a pressure caused by combustion gas of the second propellant and/or the combustion gas of the igniter charge; and a plurality of convexly-deformable portions configured to be convexly deformed by the pressure caused by the combustion gas of the second propellant and/or the combustion gas of the igniter charge. The rigidity of the convexly-deformable portions is higher than that of the concavely-deformable portions.

The above-described embodiments may allow stably supplying combustion gas of the propellant.

DETAILED DESCRIPTION OF PREFERRED EMBODIMENTS

Figure 1:
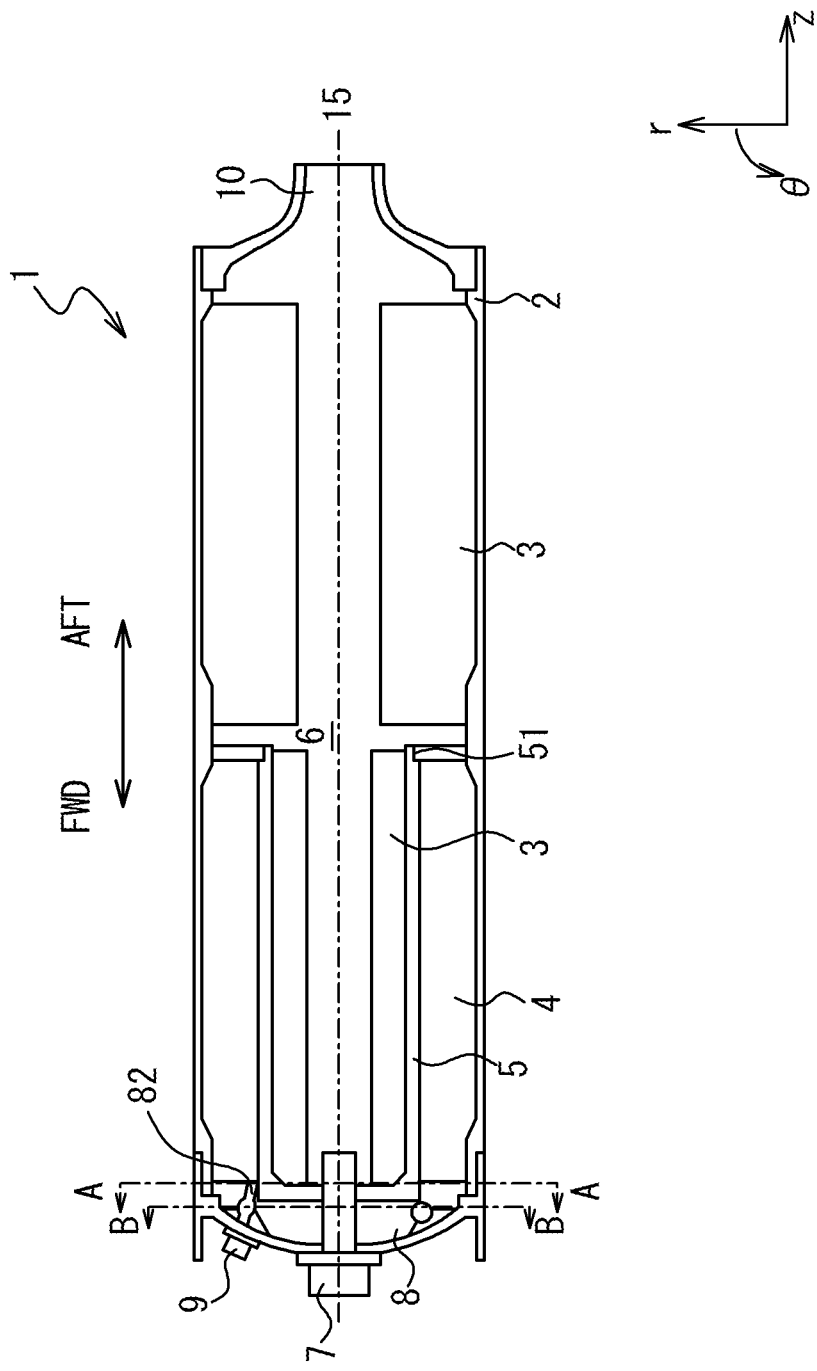
FIG. 1 is a configuration diagram of an example multi-pulse gas generator device, according to one or more embodiments.

In one or more embodiments, as illustrated in FIG. 1, a multi-pulse gas generator device 1 may include a pressure vessel 2, a first propellant 3, a second propellant 4, a barrier membrane 5 configured to separate the first propellant 3 and the second propellant 4, a combustion chamber 6, a first igniter device 7, an igniter charge combustion gas exhaust device 8, a second igniter device 9, and a combustion gas expelling section 10. The multi-pulse gas generator device 1 may be configured as a two-pulse gas generator device configured to supply combustion gas in two steps by combusting the first propellant 3 and the second propellant 4. The multi-pulse gas generator device 1 may be used in a multi-pulse rocket motor.

Figure 2:
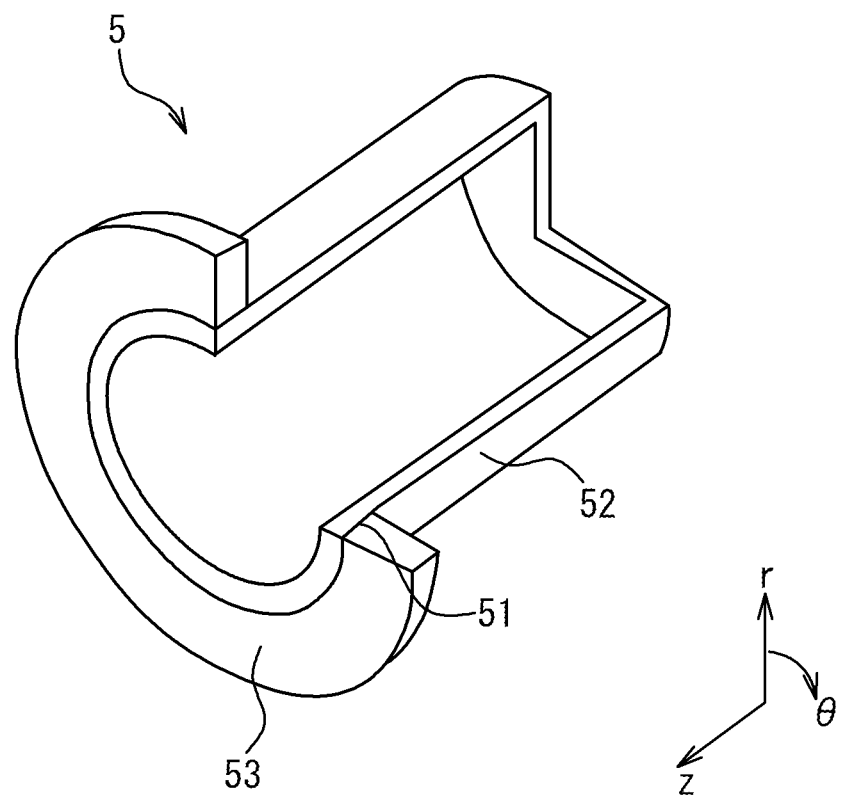
FIG. 2 is a partial section view of an example barrier membrane, according to one or more embodiments.

As illustrated in FIG. 2, the barrier membrane 5 includes a tubular portion 52 and a ring-shaped portion 53. The tubular portion 52 is shaped in a tubular shape, for example, in a cylindrical shape. One end of the tubular portion 52 is coupled to the ring-shaped portion 53, and the other end is coupled to the pressure vessel 2. The ring-shaped portion 53 is shaped in a ring shape, for example, in a torus shape. The ring-shaped portion 53 has an inner face coupled to the tubular portion 52 and an outer face coupled to the pressure vessel 2. The connection between the tubular portion 52 and the ring-shaped portion 53 is formed as a tearable portion 51 configured to be easily torn. The barrier membrane 5 may be formed of, for example, elastic material, such as Ethylene-Propylene-Diene-Monomer (EPDM) rubber and silicone rubber. For easiness of understanding, a description is given of the multi-pulse gas generator device 1 using a cylindrical coordinate system as illustrated in FIG. 1. The +z direction is defined as a direction going from the first igniter device 7 to the combustion chamber 6 along a reference axis 15 of the tubular portion 52; the +r direction is defined as a direction orthogonal to the reference axis 15 and going apart from the reference axis 15; and the θ direction is defined as a circumferential direction around the reference axis 15. The +z direction may be also referred to as aft and the −z direction may be also referred to as forward.

The multi-pulse gas generator device 1 is configured to produce combustion gas by combusting the first propellant 3 and expel the produced combustion gas. As illustrated in FIG. 1, the first propellant 3 is disposed in the pressure vessel 2, for example, in contact with the inner wall of the pressure vessel 2. The multi-pulse gas generator device 1 is configured to ignite the first propellant 3 with the first igniter device 7 and produce combustion gas by combusting the first propellant 3 in the combustion chamber 6. The produced combustion gas of the first propellant 3 is expelled through the combustion gas expelling section 10. The first propellant 3 may be disposed inside of the barrier membrane 5. For example, the first propellant 3 may have a side face in contact with the barrier membrane 5. The second propellant 4 is disposed in the pressure vessel 2, for example, in contact with the inner wall of the pressure vessel 2, while being disposed outside of the barrier membrane 5. Since the second propellant 4 is separated from the first propellant 3 by the barrier membrane 5, the second propellant 4 is not combusted until the second igniter device 9 ignites the second propellant 4. The barrier membrane 5 may be configured to cover the entirety of the initial combustion face of the second propellant 4.

Figure 3:
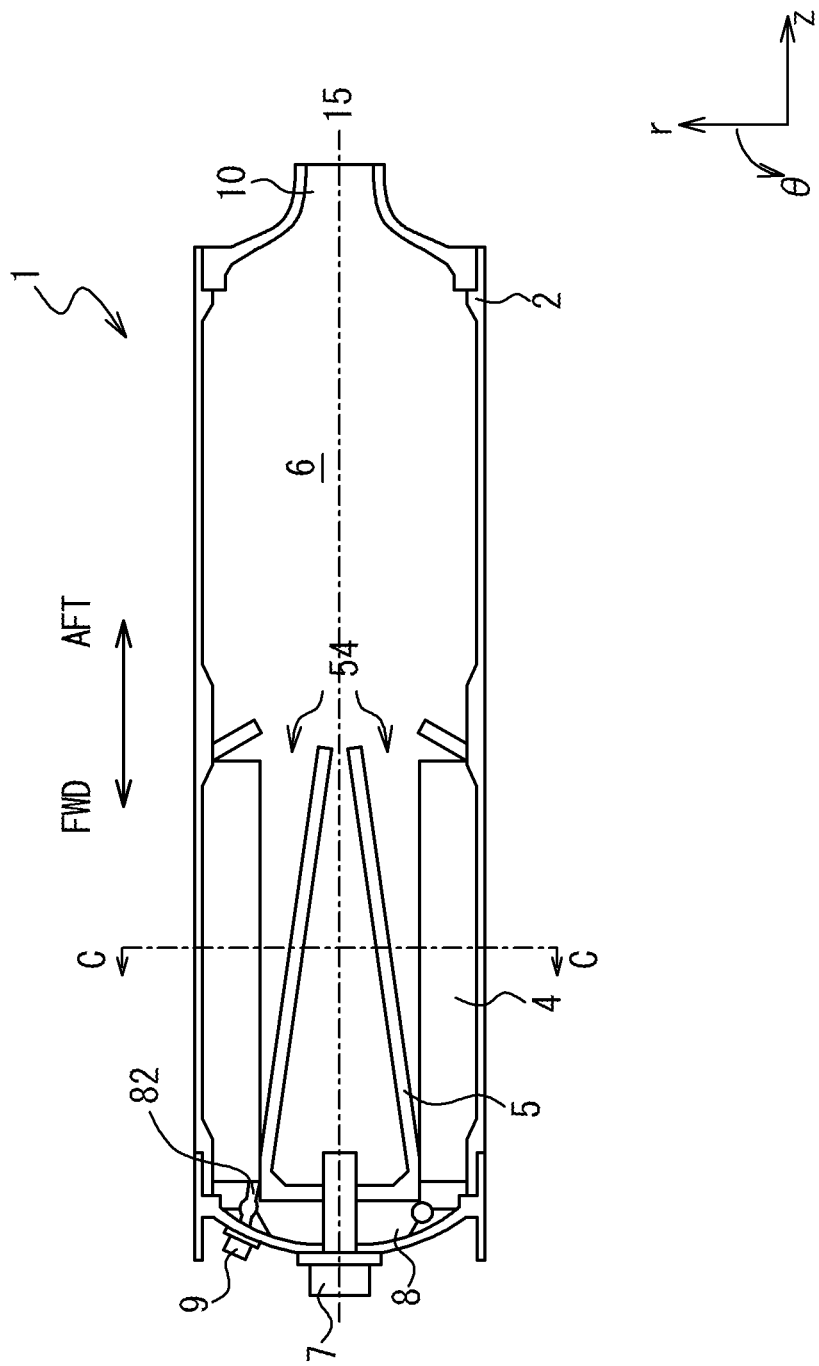
FIG. 3 illustrates an example operation of a multi-pulse gas generator device, according to one or more embodiments.

As illustrated in FIG. 3, the second igniter device 9 is configured to produce combustion gas of igniter charge at desired timing after the first propellant 3 is ignited. The combustion gas of the igniter charge produced by the second igniter device 9 is exhausted against the second propellant 4 via a conduit 82 of the igniter charge combustion gas exhaust device 8 to ignite the second propellant 4. The combustion gas of the igniter charge and/or the combustion gas of the second propellant 4 press the barrier membrane 5, and thereby the barrier membrane 5 is deformed and buckled to be torn at the tearable portion 51. By tearing the barrier membrane 5 at the tearable portion 51, a through hole 54 is formed through the barrier membrane 5, and this allows expelling the combustion gas of the second propellant 4 from the combustion gas expelling section 10 via the through hole 54 of the barrier membrane 5. The second igniter device 9 may be configured to produce combustion gas of igniter charge when desired time has elapsed after the first igniter device 7 ignites the first propellant 3.

Figure 4:
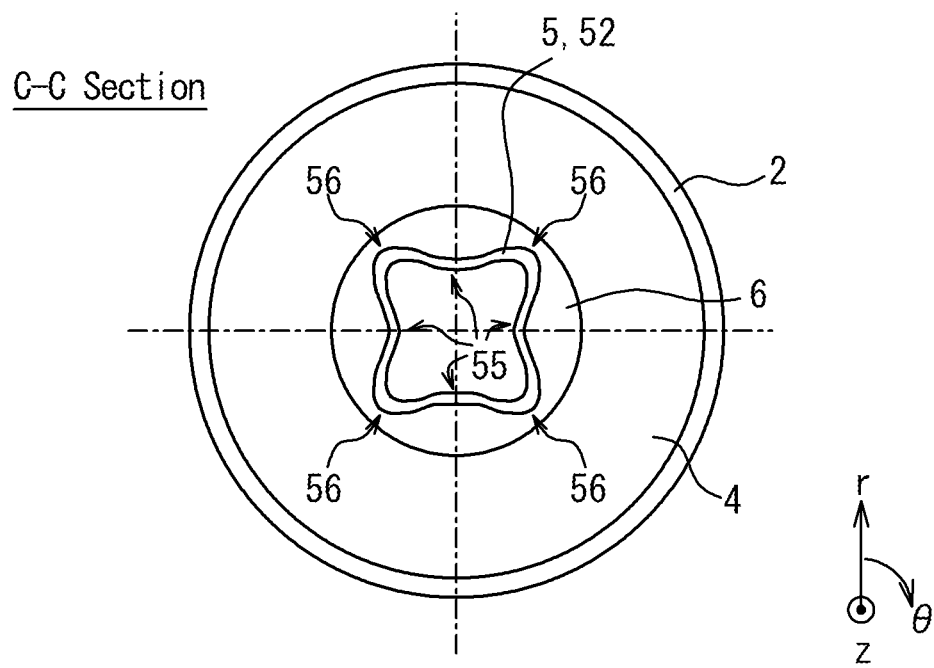
FIG. 4 is a section view illustrating an example structure on the C-C section in FIG. 3, according to one or more embodiments.

As illustrated in FIG. 4, the tubular portion 52 of the barrier membrane 5 may be deformed and buckled after the barrier membrane 5 is torn at the tearable portion 51. When the tubular portion 52 is deformed and buckled, a plurality of concavely-deformable portions 55 of the tubular portion 52 and a plurality of convexly-deformable portions 56 of the tubular portion 52 are deformed. In the state in which the tubular portion 52 is deformed and buckled, the concavely-deformable portions 55 are deformed in a direction orthogonal to the reference axis 15 (e.g., the −r direction) more largely than the convexly-deformable portions 56. The concavely-deformable portions 55 are concavely deformed in the circumferential direction (the θ direction), which is orthogonal to the reference axis 15 and defined along the tubular portion 52. The convexly-deformable portions 56 are convexly deformed in the circumferential direction (the θ direction) which is orthogonal to the reference axis 15 and directed along the side face of the tubular portion 52.

The inventors have found that the combustion gas of the second propellant 4 can be stably supplied by controlling the deformation of the barrier membrane 5. The barrier membrane 5 is configured to be deformed and buckled when the combustion gas of the second propellant 4 is supplied to the combustion chamber 6. The combustion gas of the second propellant 4 is supplied to the combustion chamber 6 via the through hole 54 having a shape depending on the shape of the barrier membrane 5 after the deformation. Accordingly, the supply of the combustion gas of the second propellant 4 can be controlled by controlling the shape of the barrier membrane 5 after the deformation.

For example, the flows of the combustion gas of the igniter charge and the combustion gas of the second propellant 4 may vary depending on the shape of the barrier membrane 5 after the barrier membrane 5 are deformed and buckled. The flows of the combustion gas of the igniter charge and the combustion gas of the second propellant 4 can be controlled by controlling the deformation of the barrier membrane 5. For example, the multi-pulse gas generator device 1 may be configured such that the concavely-deformable portions 55 are disposed at even intervals in the circumferential direction (the θ direction) and the convexly-deformable portions 56 are disposed at even intervals in the circumferential direction. The multi-pulse gas generator device 1 may be configured such that the concavely-deformable portions 55 and the convexly-deformable portions 56 are alternately arranged at even intervals in the circumferential direction (the θ direction). The number of the concavely-deformable portions 55 may be four as illustrated in FIG. 4.

Figure 5:
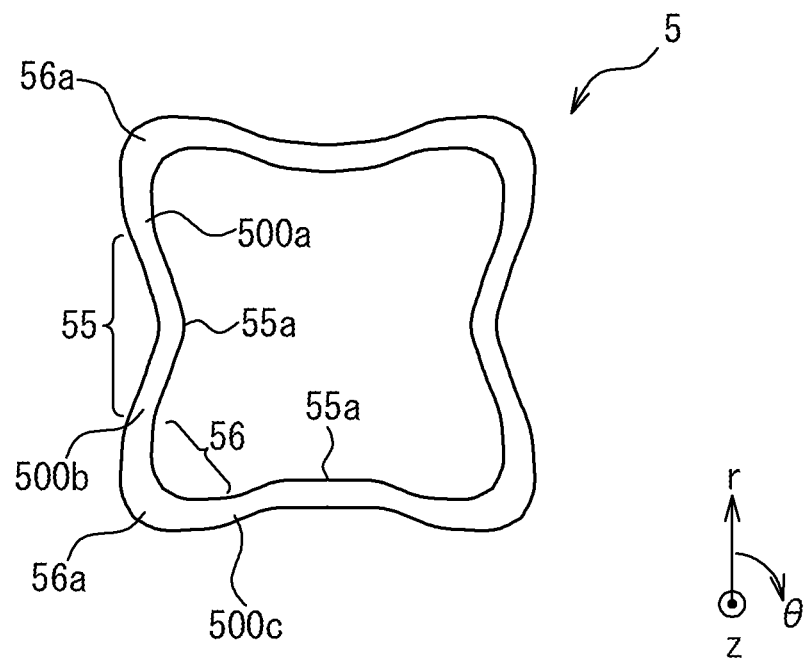
FIG. 5 illustrates example concavely-deformable portions and convexly-deformable portions, according to one or more embodiments.

As illustrated in FIG. 5, the concavely-deformable portions 55 may be located to incorporate the vicinities of concave vertexes 55a of the concavely-deformable portions 55 in the θ direction. The concave vertexes 55a are points on the concavely-deformable portions 55 closest to the reference axis 15. The convex vertexes 56a are points of the convexly-deformable portions 56 furthest away from the reference axis 15. The midpoints 500 (e.g., midpoints 500a, 500b, and 500c) are each the midpoint of the corresponding concave vertex 55a and convex vertex 56a in the θ direction. The distance between a midpoint 500 and the corresponding concave vertex 55a is equal to the distance between the midpoint 500 and the corresponding convex vertex 56a. A concavely-deformable portion 55 may be located to cover the range between the corresponding midpoints 500a and 500b in the θ direction, where the midpoint 500a is the midpoint of the corresponding concave vertex 55a and one of its two adjacent convex vertexes 56a, and the midpoint 500b is the midpoint of the corresponding concave vertex 55a and the other of the two adjacent convex vertexes 56a. A convexly-deformable portion 56 may be located to cover the range between the corresponding midpoints 500b and 500c in the θ direction, where the midpoint 500b is the midpoint of the corresponding convex vertex 56a and one of its two adjacent concave vertexes 55a, and the midpoint 500c is the midpoint of the corresponding convex vertex 56a and the other of the two adjacent concave vertexes 55a.

Control by Flow Rate of Combustion Gas of Igniter Charge

The igniter charge combustion gas exhaust device 8 may be configured such that the flow rate of the combustion gas of the igniter charge exhausted against portions of the second propellant 4 disposed outside of the concavely-deformable portions 55 is higher than the flow rate of the combustion gas of the igniter charge exhausted against portions of the second propellant 4 disposed outside of the convexly-deformable portions 56. As illustrated in FIG. 1, the igniter charge combustion gas exhaust device 8 is disposed at the −z direction end of the barrier membrane 5 and includes a conduit 82 configured to feed combustion gas of igniter charge from the second igniter device 9 to the second propellant 4. The conduit 82 is configured to exhaust the combustion gas of the igniter charge produced by the second igniting device 9 against the second propellant 4. The igniter charge combustion gas exhaust device 8 is configured to exhaust the combustion gas of the igniter charge, for example, against the portions of the second propellant 4 located outside of the concavely-deformable portions 55 with a first flow rate and exhaust the combustion gas of the igniter charge against the portions of the second propellant 4 located outside of the convexly-deformable portions 56 with a second flow rate different from the first flow rate. The flow rate may be the volume or mass of passing fluid or gas per unit time. For example, the flow rate of combustion gas of the igniter charge may be the volume or mass of the combustion gas of the igniter charge per unit time that passes through one or more exhaust holes 81 configured to exhaust the combustion gas of the igniter charge at desired locations.

Figure 6:
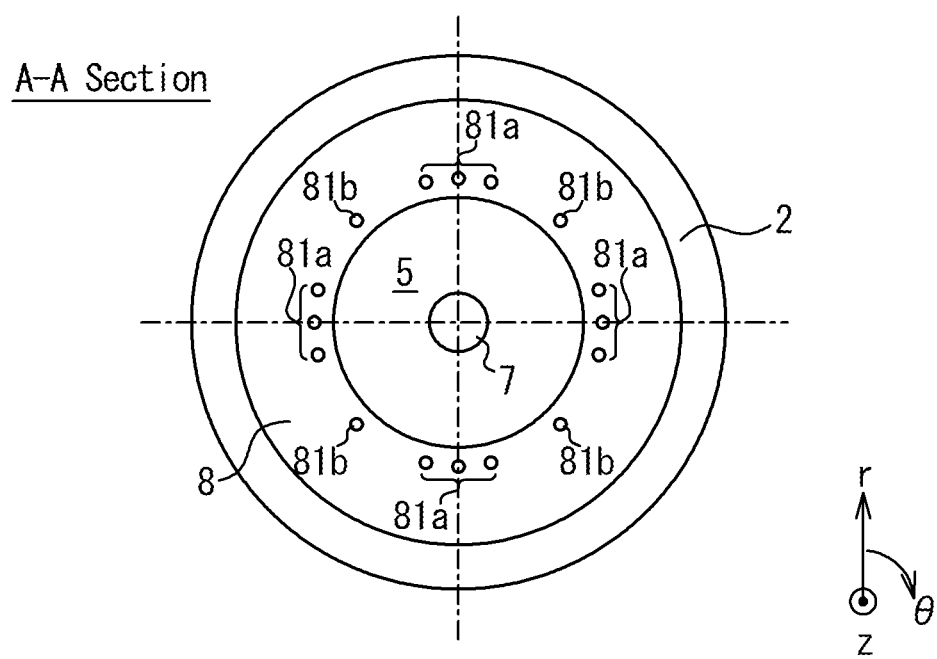
FIG. 6 is a section view illustrating an example structure on the A-A section of FIG. 1, according to one or more embodiments.

As illustrated in FIG. 6, the igniter charge combustion gas exhaust device 8 has at least one exhaust hole 81. The igniter charge combustion gas exhaust device 8 may have a plurality of exhaust holes 81 at the +z end face that surround the outer side of the barrier membrane 5. The exhaust holes 81 may include first exhaust holes 81*a* and second exhaust holes 81*b*. The first exhaust holes 81*a* may be disposed at locations corresponding to the concavely-deformable portions 55 in the θ direction and configured to exhaust the combustion gas of the igniter charge against at least part of the concavely-deformable portions 55 and the portions of the second propellant 4 located outside of the concavely-deformable portions 55. The second exhaust holes 81*b* may be disposed at locations corresponding to the convexly-deformable portions 56 in the θ direction and configured to exhaust the combustion gas of the igniter charge against at least part of the convexly-deformable portions 56 and the portions of the second propellant 4 located outside of the convexly-deformable portions 56. The number of the first exhaust holes 81*a* for one concavely-deformable portion 55 is larger than the number of the second exhaust holes 81*b* for one convexly-deformable portion 56. For example, the total sum of the hole areas of the first exhaust holes 81*a* for one concavely-deformable portion 55 may be larger than the total sum of the hole areas of the second exhaust holes 81*b* for one convexly-deformable portion 56. This allows the igniter charge combustion gas exhaust device 8 to exhaust the combustion gas of the igniter charge onto the vicinities of the concavely-deformable portions 55 with a larger flow rate than the flow rate with which the combustion gas of the igniter charge is exhausted onto the vicinities of the convexly-deformable portions 56.

Figure 7:
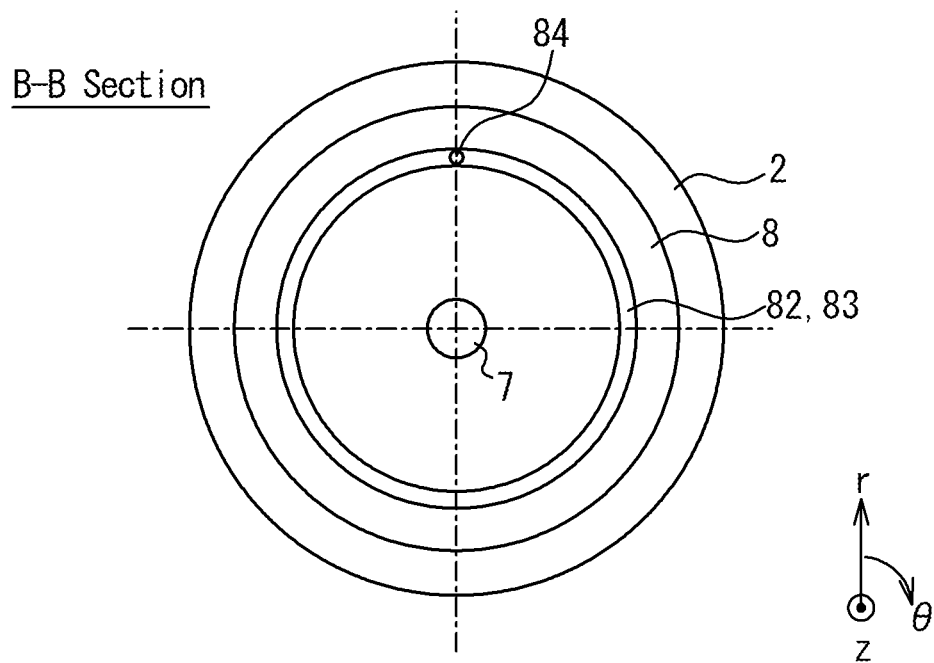
FIG. 7 is a section view illustrating an example structure on the B-B section of FIG. 1, according to one or more embodiments.
Figure 8:
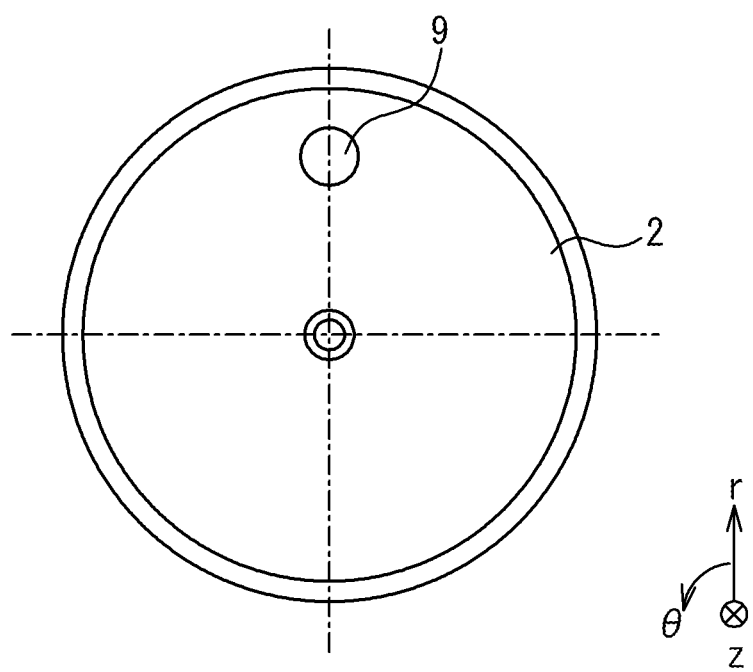
FIG. 8 is a left-side view illustrating an example configuration of a multi-pulse gas generator device, according to one or more embodiments.

As illustrated in FIG. 7, the igniter charge combustion gas exhaust device 8 incorporates a conduit 82 configured to supply the combustion gas of the igniter charge produced by the second igniter device 9 to the respective exhaust holes 81. The conduit 82 may include a ring-shaped conduit 83, for example. The ring-shaped conduit 83 has an inlet port 84 into which the combustion gas of the igniter charge comes from the second igniter device 9. The inlet port 84 may be disposed at a location corresponding to at least part of a concavely-deformable portion 55 in the θ direction. For example, an inlet port 84 may be disposed at a location corresponding to one of the concavely-deformable portions 55 in the θ direction. Disposing the inlet port 84 near the concavely-deformable portion 55 may result in that the flow rate of the combustion gas of the igniter charge exhausted from the first exhaust holes 81*a* disposed near the concavely-deformable portion 55 is larger than the flow rate of the combustion gas of the igniter charge exhausted from the second exhaust holes 81*b* disposed near the corresponding convexly-deformable portion 56. The second igniter device 9 may be disposed at a location corresponding to one of the concavely-deformable portions 55 in the θ direction, as illustrated in FIG. 8.

Control by Exhaust Hole Arrangement

The igniter charge combustion gas exhaust device 8 may be configured to exhaust the combustion gas of the igniter charge onto the vicinities of the concavely-deformable portions 55 and the convexly-deformable portions 56 with different flow rates by adjusting the arrangements (e.g., the shapes and/or the number) of the exhaust holes 81 through which the combustion gas of the igniter charge is exhausted, depending on the locations of the exhaust holes 81.

Figure 9:
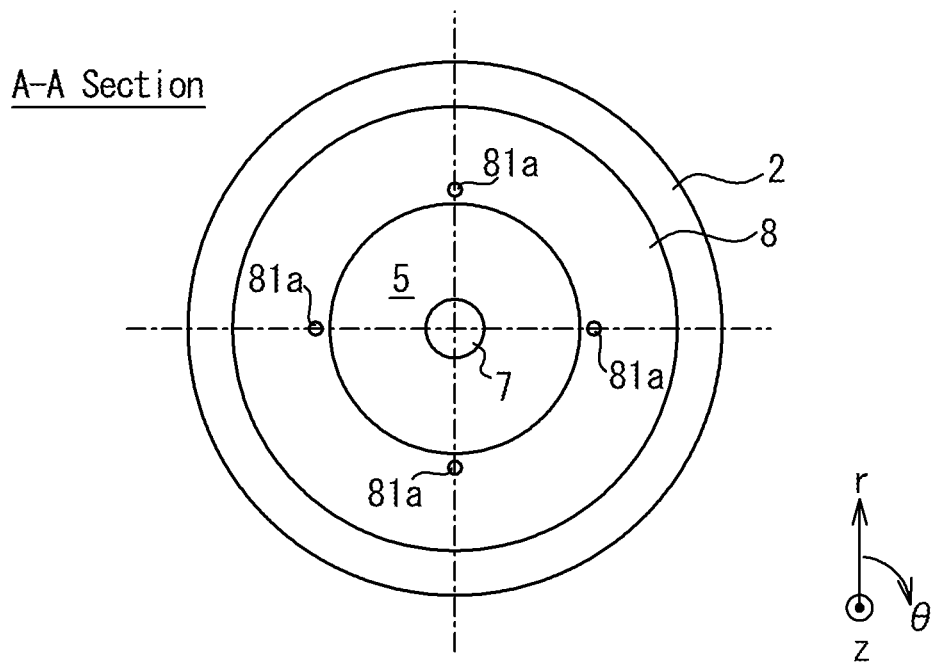
FIG. 9 is a section view illustrating an example structure on the A-A section of FIG. 1, according to one or more embodiments.

As illustrated in FIG. 9, the igniter charge combustion gas exhaust device 8 may have exhaust holes 81 disposed at locations corresponding to the concavely-deformable portions 55 in the θ direction. For example, all the exhaust holes 81 may be configured to exhaust the combustion gas of the igniter charge against the concavely-deformable portions 55 and the portions of the second propellant 4 located outside of the concavely-deformable portions 55. The convexly-deformable portions 56 may be each disposed between corresponding adjacent two of the exhaust holes 81. This may allow exhausting the combustion gas of the igniter charge onto the vicinities of the concavely-deformable portions 55 with a flow rate larger than the flow rate with which the combustion gas of the igniter charge is exhausted onto the vicinities of the convexly-deformable portions 56. Multiple exhaust holes 81 may be disposed at locations corresponding to one concavely-deformable portion 55 in the θ direction.

Figure 10:
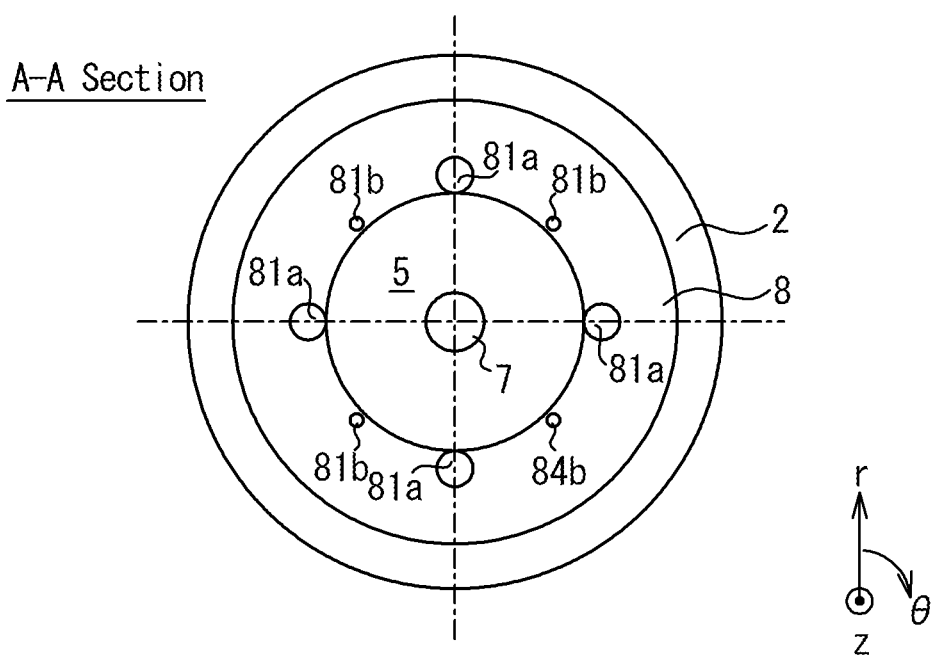
FIG. 10 is a section view illustrating an example structure on the A-A section of FIG. 1, according to one or more embodiments.

The igniter charge combustion gas exhaust device 8 may have multiple exhaust holes 81 with different hole areas as illustrated in FIG. 10. For example, the hole area of the first exhaust holes 81*a* disposed at locations corresponding to the concavely-deformable portions 55 in the θ direction may be larger than that of the second exhaust holes 81*b* disposed at locations corresponding to the convexly-deformable portions 56 in the θ direction. This may allow exhausting the combustion gas of the igniter charge onto the vicinities of the concavely-deformable portions 55 with a flow rate larger than the flow rate with which the combustion gas of the igniter charge is exhausted onto the vicinities of the convexly-deformable portions 56.

Figure 11:
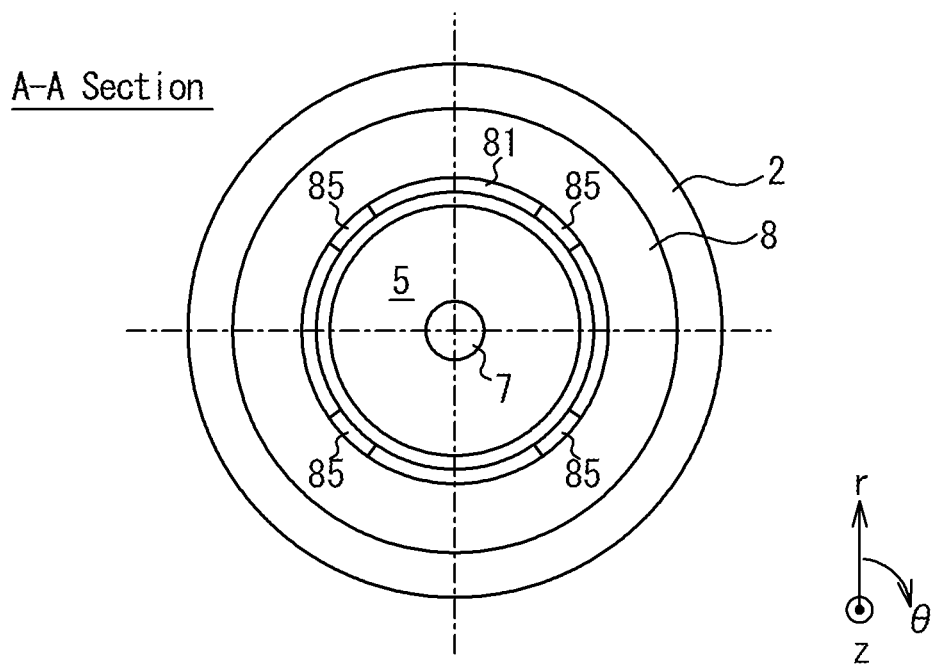
FIG. 11 is a section view illustrating an example structure on the A-A section of FIG. 1, according to one or more embodiments.

The igniter charge combustion gas exhaust device 8 may have a ring-shaped exhaust hole 81 configured to surround the outer side of the barrier membrane 5 as illustrated in FIG. 11. The igniter charge combustion gas exhaust device 8 may include exhaust resistance elements 85 in the ring-shaped exhaust hole 81, the exhaust resistance elements 85 being located at locations corresponding to at least part of the convexly-deformable portions 56 in the θ direction. The exhaust resistance elements 85 may be disposed at locations corresponding to the entireties of the convexly-deformable portions 56 in the θ direction. The exhaust resistance elements 85 may be disposed to protrude from a wall surface (e.g., one of the r direction wall surfaces) of the exhaust hole 81, filling at least part of the ring-shaped exhaust hole 81 in the r direction. The exhaust resistance elements 85 may be disposed to protrude from one of the r direction wall surfaces to the other of the r direction wall surfaces to fill the ring-shaped exhaust hole 81 in the r direction. Disposing the exhaust resistance elements 85 may result in that the width of the ring-shaped exhaust hole 81 in the vicinities of the convexly-deformable portions 56 in the r direction is smaller than that of the ring-shaped exhaust hole 81 in the vicinities of the concavely-deformable portions 55 in the r direction. This may allow exhausting the combustion gas of the igniter charge onto the vicinities of the concavely-deformable portions 55 with a flow rate larger than the flow rate with which the combustion gas of the igniter charge is exhausted onto the vicinities of the convexly-deformable portions 56.

As thus describe, the igniter charge combustion gas exhaust device 8 may be configured such that the first exhaust holes 81*a* disposed at locations corresponding to the concavely-deformable portions 55 in the θ direction are formed with an arrangement different from that of the second exhaust holes 81*b* disposed at locations corresponding to the convexly-deformable portions 56. By exhausting combustion gas of igniter charge onto the vicinities of the concavely-deformable portions 55 with a flow rate larger than the flow rate with which combustion gas of igniter charge is exhausted onto the vicinities of the convexly-deformable portions 56, the concavely-deformable portions 55 are deformed in −r direction more largely than the convexly-deformable portions 56. Further, the combustion gas of the second propellant 4 deforms and buckles the barrier membrane 5 by pressing the concavely-deformable portions 55 in the −r direction. As thus described, the multi-pulse gas generator device 1 may be configured to adjust the locations of the concavely-deformable portions 55 and the convexly-deformable portions 56 of the barrier membrane 5, providing control of the shape of the barrier membrane 5 after the deformation.

Control by Conduit Shape

The igniter charge combustion gas exhaust device 8 may be configured to exhaust combustion gas of igniter charge onto the vicinities of the concavely-deformable portions 55 and the convexly-deformable portions 56 with different flow rates depending on the shape of the ring-shaped conduit 83.

Figure 12:
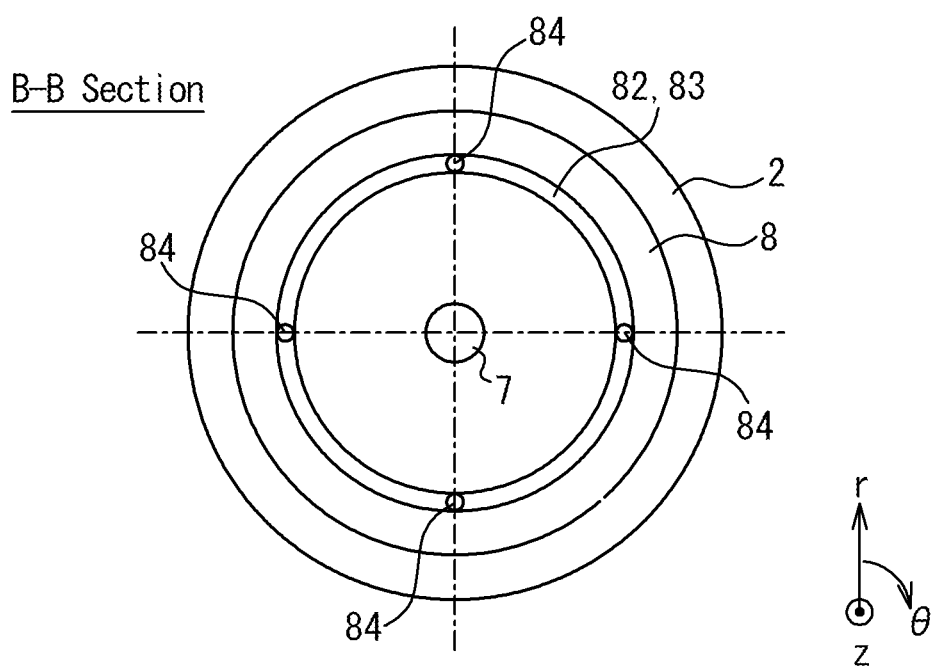
FIG. 12 is a section view illustrating an example structure on the B-B section of FIG. 1, according to one or more embodiments.

As illustrated in FIG. 12, the ring-shaped conduit 83 of the igniter charge combustion gas exhaust device 8 may have a plurality of inlet ports 84 into which the combustion gas of the igniter charge comes from the second igniter device 9. The inlet ports 84 are disposed, for example, at locations corresponding to at least one or more of the concavely-deformable portions 55 in the θ direction. The inlet ports 84 may be disposed at the locations corresponding to all the concavely-deformable portions 55 in the θ direction. By disposing an inlet port 84 at a location to corresponding to a concavely-deformable portion 55 in the θ direction, the distances between the inlet port 84 and the first exhaust holes 81a disposed in the vicinity of the concavely-deformable portion 55 are shorter than the distances between the inlet port 84 and the second exhaust holes 81b disposed in the vicinity of the corresponding convexly-deformable portion 56. This may make the flow rate of the combustion gas of the igniter charge exhausted through the first exhaust holes 81a larger than the flow rate of the combustion gas of the igniter charge exhausted through the second exhaust holes 81b. It is noted that one second igniter device 9 may be disposed for one inlet port 84. Alternatively, one second igniter device 9 may be disposed for a plurality of inlet ports 84.

Figure 13:
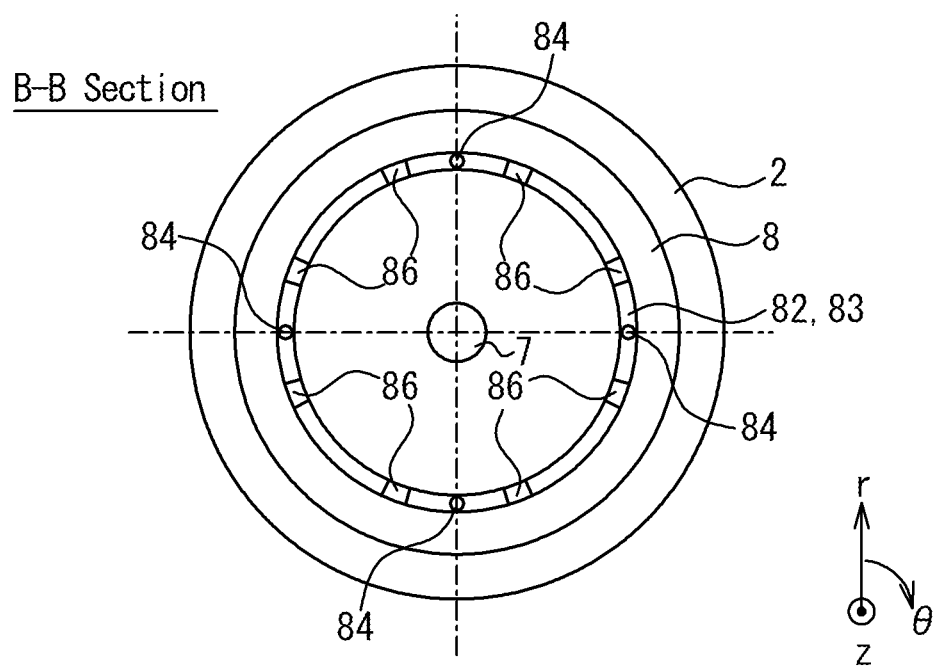
FIG. 13 is a section view illustrating an example structure on the B-B section of FIG. 1, according to one or more embodiments.

As illustrated in FIG. 13, the igniter charge combustion gas exhaust device 8 may include flow resistance elements 86 in the ring-shaped conduit 83 between the inlet ports 84 and the locations corresponding to the convexly-deformable portions 56 in the θ direction. The flow resistance elements 86 are configured to reduce the flow rate of the fluid or gas that passes therethrough. For example, the flow resistance elements 86 may be configured to protrude inward from a wall surface of the ring-shaped conduit 83 to reduce the flow rate of the combustion gas of the igniter charge at the downstream of the flow resistance elements 86 compared to the flow rate at the upstream. For example, the inlet ports 84 may be disposed at locations corresponding to at least one or more of the concavely-deformable portions 55 in the θ direction. The flow rate of combustion gas of igniter charge between a flow resistance element 86 and an inlet port 84 may be larger than that of combustion gas of igniter charge between the flow resistance element 86 and the corresponding second exhaust holes 81b. This may result in that the flow rate of the combustion gas of the igniter charge exhausted from the corresponding first exhaust holes 81a is larger than that of the combustion gas of the igniter charge exhausted from the corresponding second exhaust holes 81b. The flow resistance elements 86 may include orifices.

As thus described, adjustment of the shape of the ring-shaped conduit 83 may allow exhausting combustion gas of igniter charge onto the vicinities of the concavely-deformable portions 55 with a flow rate larger than the flow rate with which combustion gas of igniter charge is exhausted onto the vicinities of the convexly-deformable portions 56. As such, the multi-pulse gas generator device 1 is configured to adjust the locations of the concavely-deformable portions 55 and the convexly-deformable portions 56 of the barrier membrane 5, providing control of the shape of the barrier membrane 5 after the deformation.

Control by Exhaust Direction of Combustion Gas of Igniter Charge

The igniter charge combustion gas exhaust device 8 may be configured to adjust the pressure exerted on the barrier membrane 5 by the combustion gas of the igniter charge onto exhausted onto the vicinities of the concavely-deformable portions 55 and the convexly-deformable portions 56 by adjusting the exhaust directions of combustion gas of igniter charge depending on the locations of the exhaust holes 81.

Figure 14A:
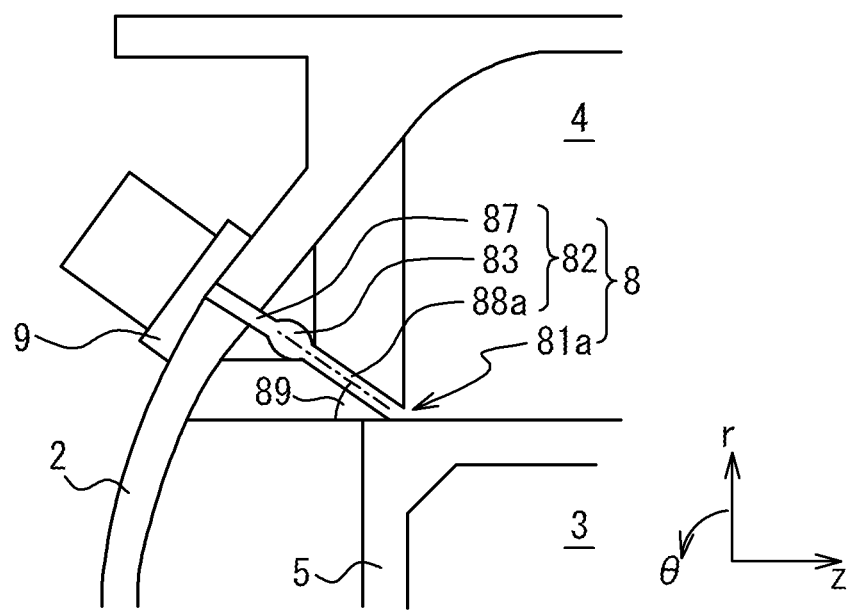
FIG. 14A is a configuration diagram of an example igniter charge combustion gas exhaust device, according to one or more embodiments.

As illustrated in FIG. 14A, a first outflow conduit 88a of a first exhaust hole 81a may be formed to extend in a direction oblique to the side face of the barrier membrane 5. The conduit 82 includes an inflow conduit 87 configured to feed combustion gas of igniter charge from the second igniter device 9 to the ring-shaped conduit 83 and outflow conduits 88 configured to feed the combustion gas of the igniter charge from the ring-shaped conduit 83 to exhaust holes 81, where the outflow conduit 88 connected between the ring-shaped conduit 83 and the first exhaust hole 81a is referred herein to as the first outflow conduit 88a. The exhaust direction of the combustion gas of the igniter charge has a component of the −r direction as the extending direction of the first outflow conduit 88a in the first exhaust hole 81a is oblique to the side face of the barrier membrane 5. This may allow the combustion gas of the igniter charge exhausted from the first exhaust hole 81a to press the barrier membrane 5. The combustion gas of the igniter charge may not be exhausted directly onto the barrier membrane 5.

Figure 14B:
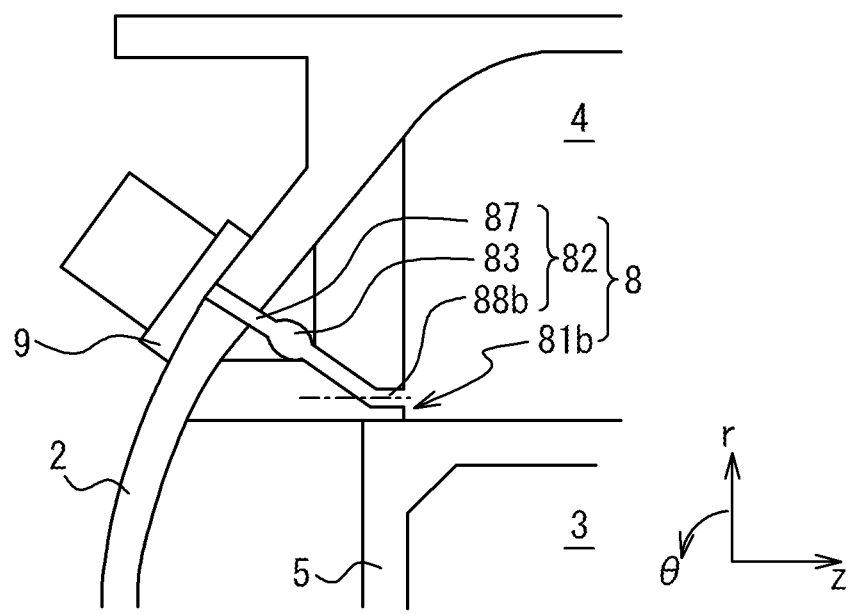
FIG. 14B is a configuration diagram of an example igniter charge combustion gas exhaust device, according to one or more embodiments.

As illustrated in FIG. 14B, a second outflow conduit 88b of a second exhaust hole 81b may be formed to extend in a direction parallel to the side face of the barrier membrane 5, where the outflow conduit 88 connected between the ring-shaped conduit 83 and the second exhaust hole 81b is referred herein to as the second outflow conduit 88b. The pressure exerted on the barrier membrane 5 by the combustion gas of the igniter charge exhausted from the second exhaust hole 81b is smaller than the pressure exerted on the barrier membrane 5 by the combustion gas of the igniter charge exhausted from the first exhaust hole 81a. As such, the igniter charge combustion gas exhaust device 8 is configured to exert desired pressures on the barrier membrane 5 in the vicinities of the concavely-deformable portions 55 and the convexly-deformable portions 56 with the appropriately-adjusted exhaust directions of the combustion gas of the igniter charge, providing control of the shape of the barrier membrane 5 after the deformation. The angle 89 between the first outflow conduit 88a in the first exhaust hole 81a and the side face of the barrier membrane 5 (see FIG. 14A) may be larger than the angle between the second outflow conduit 88b in the second exhaust hole 81b and the side face of the barrier membrane 5 (see FIG. 14B).

Control by Barrier Membrane Configuration

Figure 15:
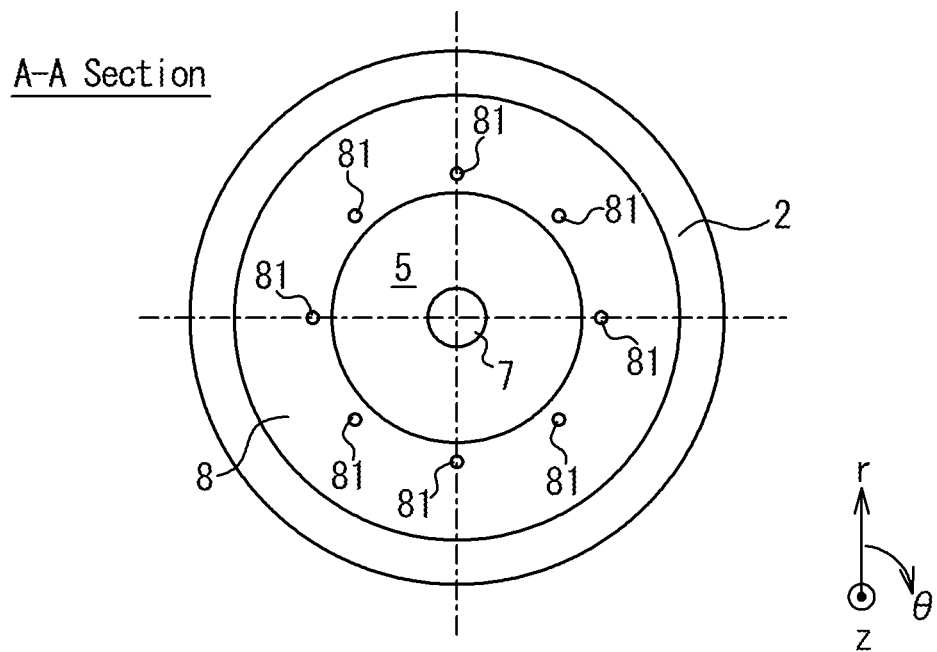
FIG. 15 is a section view illustrating an example structure on the A-A section of FIG. 1, according to one or more embodiments.

The shape of the barrier membrane 5 after the deformation may be controlled by the configuration of the barrier membrane 5, for example, by making the rigidity of the concavely-deformable portions 55 different from that the convexly-deformable portions 56. For example, the barrier membrane 5 may be configured such that the flexural rigidity of the convexly-deformable portions 56 may be higher than the flexural rigidity of the concavely-deformable portions 55 in the θ direction. In another example, the flexural rigidity of the convexly-deformable portions 56 in the z direction may be higher than the flexural rigidity of the concavely-deformable portions 55 in the z direction. In such embodiments, as illustrated in FIG. 15, the igniter charge combustion gas exhaust device 8 may be configured such that the flow rate of the combustion gas of the igniter charge exhausted onto the vicinities of the concavely-deformable portions 55 is identical to the flow rate of the combustion gas of the igniter charge exhausted onto the vicinities of the convexly-deformable portions 56. Alternatively, the igniter charge combustion gas exhaust device 8 may be configured such that the flow rate of the combustion gas of the igniter charge exhausted onto the vicinities of the concavely-deformable portions 55 is larger than the flow rate of the combustion gas of the igniter charge exhausted onto the vicinities of the convexly-deformable portions 56.

Figure 16:
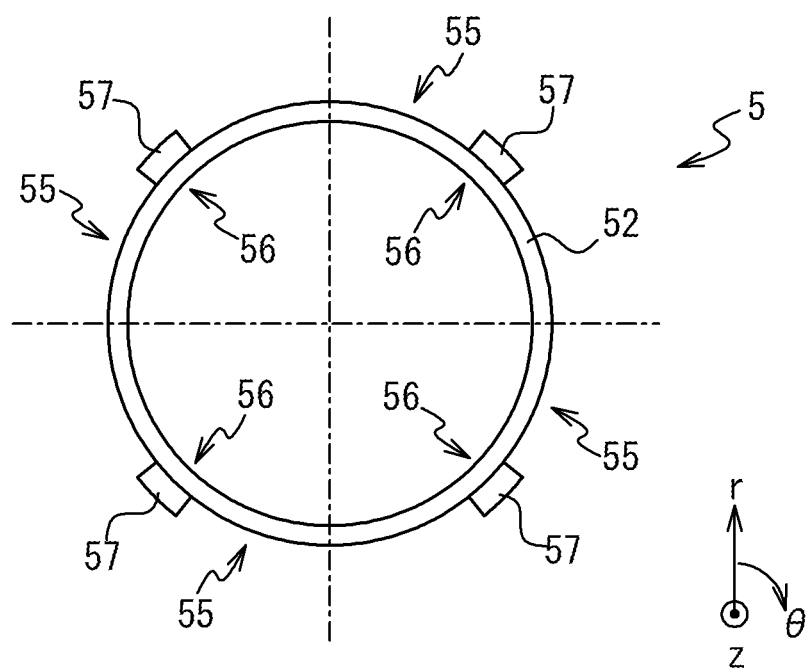
FIG. 16 is a section view of an example barrier membrane, according to one or more embodiments.

As illustrated in FIG. 16, the barrier membrane 5 may include, as reinforcing portions, reinforcing members 57 that extend in the z direction at the locations corresponding to the convexly-deformable portions 56 in the θ direction. The reinforcing members 57 are shaped in such a columnar shape that the reinforcing members 57 are couplable to the side face of the tubular portion 52 of the barrier membrane 5. For example, the reinforcing members 57 may be coupled to the side face of the tubular portion 52 after the tubular portion 52 of the barrier membrane 5 is formed. As the convexly-deformable portions 56 include the reinforcing members 57, the convexly-deformable portions 56 of the barrier membrane 5 have a higher rigidity (e.g., flexural rigidity in the z direction) than that of the concavely-deformable portions 55. This makes the concavely-deformable portions 55 buckled more easily than the convexly-deformable portions 56 when the side face of the barrier membrane 5 is pressed by the combustion gas of the second propellant 4 and/or the combustion gas of the igniter charge.

Figure 17:
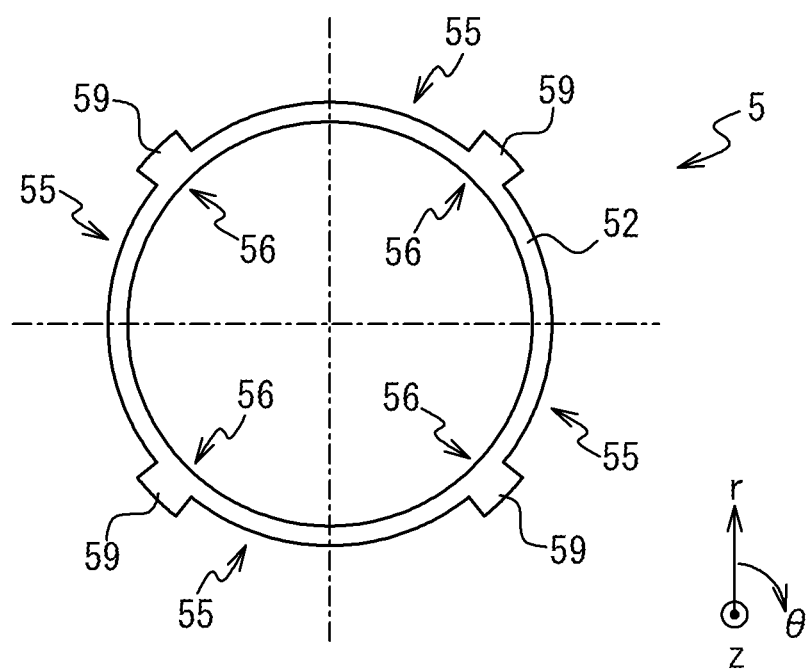
FIG. 17 is a section view of an example barrier membrane, according to one or more embodiments.

As illustrated in FIG. 17, the barrier membrane 5 may include, as reinforcing portions, protruding portions 59 that extend in the z direction at the locations corresponding to the convexly-deformable portions 56 in the θ direction. The protruding portions 59 of the barrier membrane 5 are configured such that the thickness of the protruding portions 59 is thicker than those of other portions. As the convexly-deformable portions 56 incorporate the protruding portions 59, the convexly-deformable portions 56 have a higher rigidity (e.g., flexural rigidity in the z direction) than that of the concavely-deformable portions 55. This makes the concavely-deformable portions 55 buckled more easily than the convexly-deformable portions 56 when the side face of the barrier membrane 5 is pressed by the combustion gas of the second propellant 4 and/or the combustion gas of the igniter charge.

Figure 18:
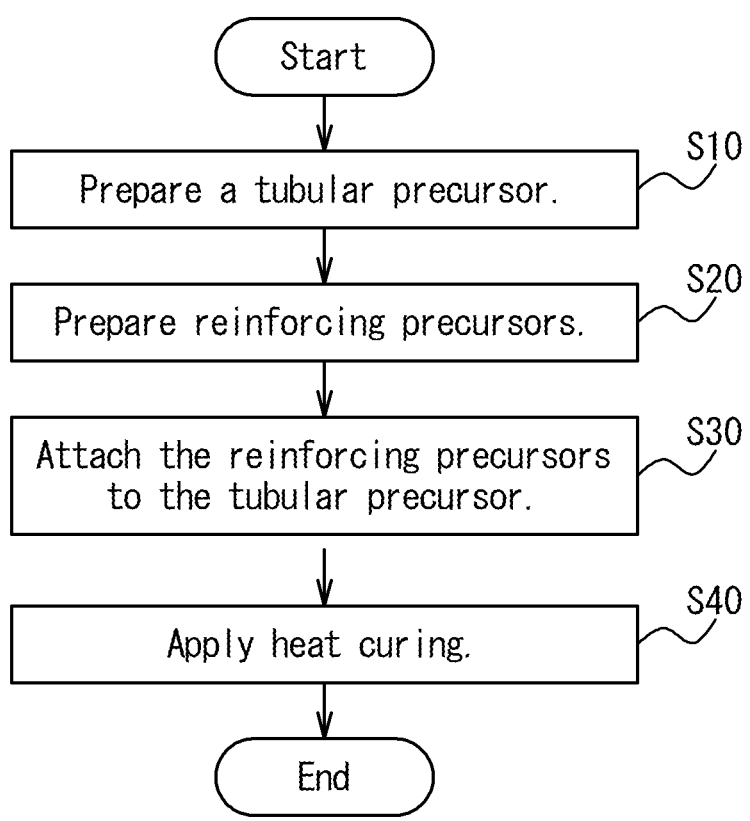
FIG. 18 is a flowchart illustrating an example manufacturing method of a tubular portion of a barrier membrane, according to one or more embodiments.

The barrier membrane 5 may be formed of elastomer, such as fiber-reinforced rubber. For example, the ratio of reinforcing fibers directed in the z direction (e.g., the ratio of the reinforcing fibers directed in the z direction to the total reinforcing fibers) in the protruding portions 59 may be higher than that in other portions. In such embodiments, the tubular portion 52 of the barrier membrane 5 may be manufactured through a process illustrated in FIG. 18. At step S10, a tubular precursor is prepared. For example, the tubular precursor may be prepared by filling a tubular mold with reinforcing fibers and slurry. At step S20, reinforcing precursors, which will become the protruding portions 59 later, are prepared. The reinforcing precursors include more reinforcing fibers directed in a first direction than reinforcing fibers directed in other directions and are shaped to extend in the first direction. At step S30, an assembled precursor is prepared by attaching the reinforcing precursors to the tubular precursor. The reinforcing precursors are attached to the tubular precursor such that the extending direction of the reinforcing precursors (e.g., the first direction) are directed in the direction of the reference axis 15 of the tubular precursor. At step S40, the assembled precursor is heat-cured to complete the tubular portion 52 of the barrier membrane 5.

Figure 19:
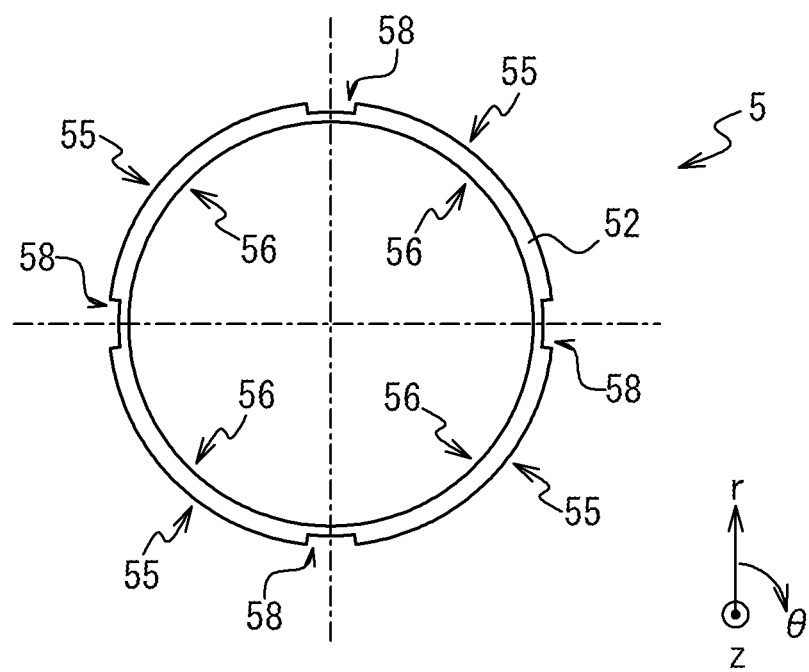
FIG. 19 is a section view of an example barrier membrane, according to one or more embodiments.

As illustrated in FIG. 19, the barrier membrane 5 may include weakened portions 58 at the locations corresponding to the concavely-deformable portions 55 in the θ direction. The weakened portions 58 may be formed as portions of the barrier membrane 5 having a thickness thinner than other portions. The weakened portions 58 may be formed, for example, by grinding the side face of the tubular portion 52 of the barrier membrane 5 after forming the tubular portion 52. Alternatively, the weakened portions 58, which have a thickness thinner than other portions, may be formed during a process to form the tubular portion 52. In such embodiments, the barrier membrane 5 is configured to be easily buckled at the concavely-deformable portions 55, since the concavely-deformable portions 55 including the weakened portions 58 have rigidity less than that of other portions.

Number of Concavely-Deformable Portions

Figure 20:
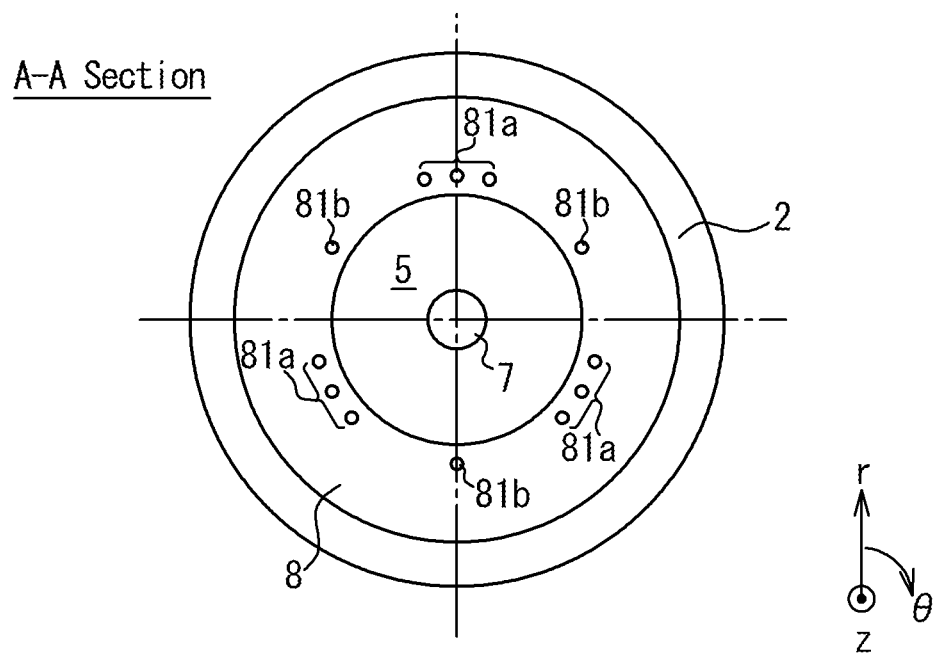
FIG. 20 is a section view illustrating an example structure on the A-A section of FIG. 1, according to one or more embodiments.
Figure 21:
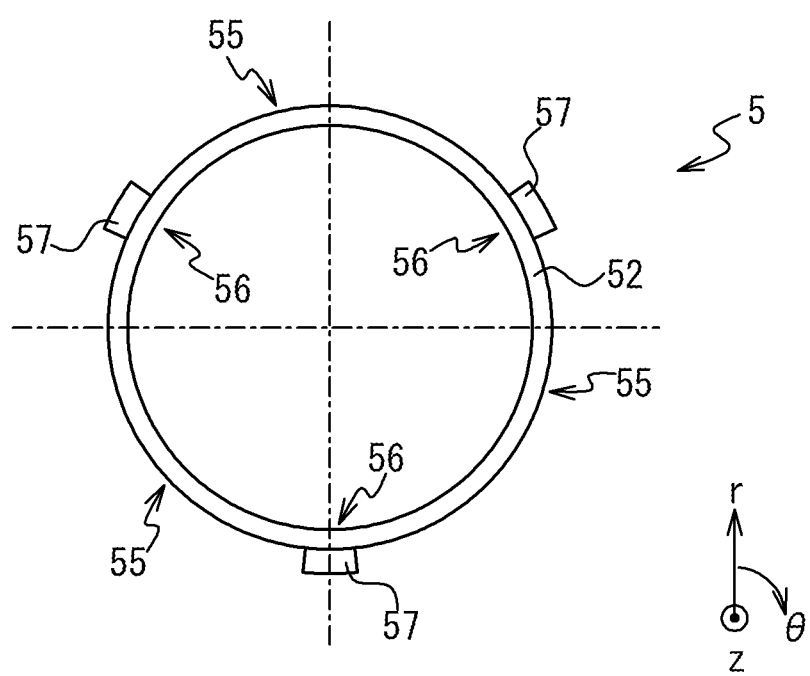
FIG. 21 is a section view of an example barrier membrane, according to one or more embodiments.

The number of the concavely-deformable portions 55 may be arbitrarily selected. For example, the number of the concavely-deformable portions 55 may be three. In such embodiments, the flow rate of the combustion gas of the igniter charge exhausted by the igniter charge combustion gas exhaust device 8 may be increased at three locations in the θ direction. For example, as illustrated in FIG. 20, the igniter charge combustion gas exhaust device 8 may be configured such that the number of the first exhaust holes 81a at three locations where the concavely-deformable portions 55 are located is more than the number of the second exhaust holes 81b at locations where the convexly-deformable portions 56 are located. Reinforcing portions of the barrier membrane 5 may be disposed at the three locations where the concavely-deformable portions 55 are located. For example, as illustrated in FIG. 21, the reinforcing members 57 may be disposed at the three locations where the concavely-deformable portions 55 of the barrier membrane 5 are to be located. The number of locations where the tubular portion 52 are buckled may be four or more. The increase in the number of locations where the tubular portion 52 are buckled may suppress deformation of the concavely-deformable portions 55.

The number of locations where the tubular portion 52 are buckled may be controlled by adjusting the thickness of the tubular portion 52 of the barrier membrane 5. For example, the number of locations where the tubular portion 52 are buckled may be increased by reducing the thickness of the tubular portion 52.

MODIFICATION EXAMPLES

The barrier membrane 5 may be formed such that the convexly-deformable portions 56 contain more reinforcing fibers directed in the z direction than the concavely-deformable portions 55. This may make the rigidity of the convexly-deformable portions 56 higher than that of the concavely-deformable portions 55 without using the protruding portions 59.

Figure 22:
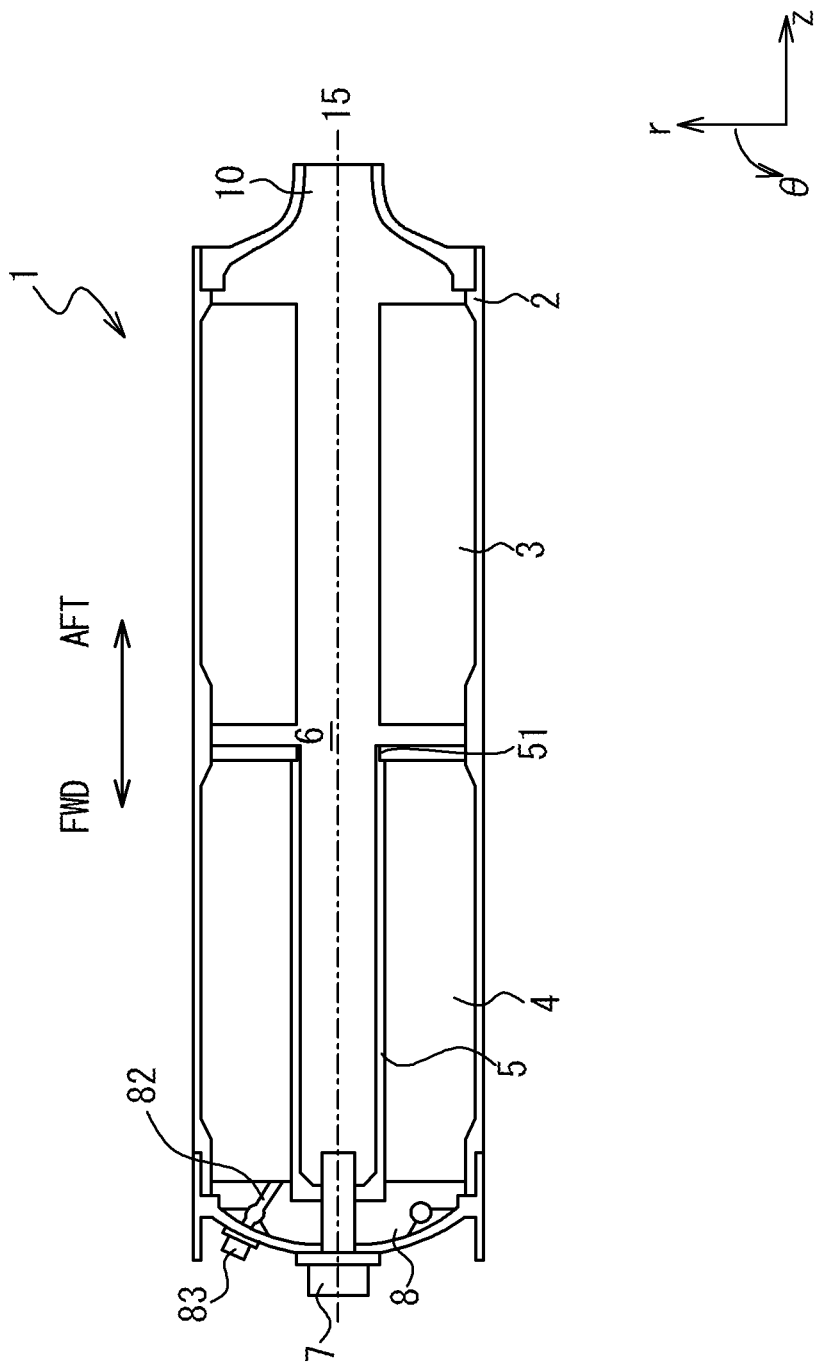
FIG. 22 is a configuration diagram of an example multi-pulse gas generator device, according to one or more embodiments.

As illustrated in FIG. 22, the multi-pulse gas generator device 1 may be configured such that the first propellant 3 is not located in the barrier membrane 5. This arrangement allows increasing the installable amount of the second propellant 4.

Figure 23:
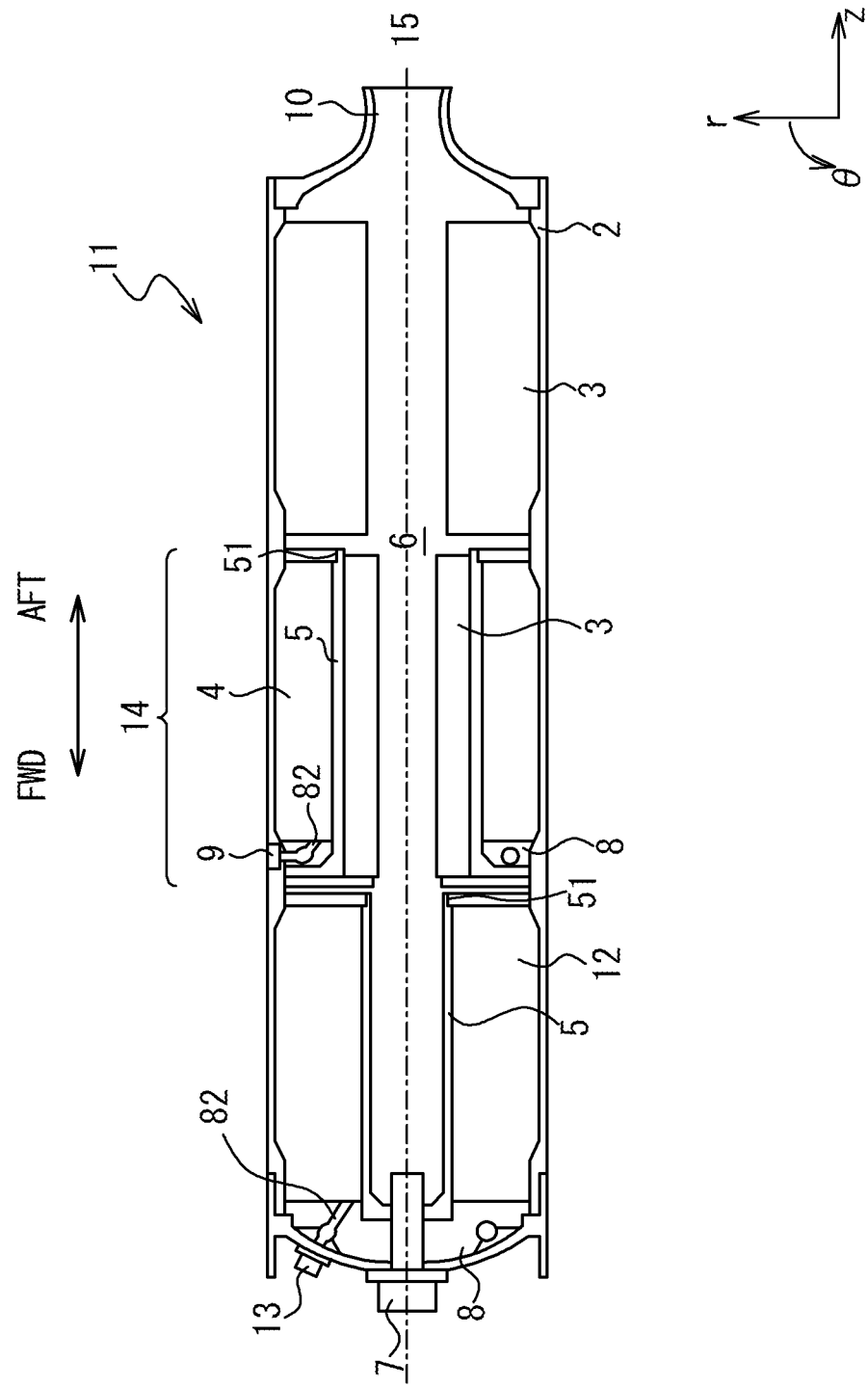
FIG. 23 is a configuration diagram of an example three-pulse gas generator device, according to one or more embodiments.

The igniter charge combustion gas exhaust device 8 may be used in three-or-more pulse gas generator devices. The three-or-more pulse gas generator devices may include a three-pulse gas generator device 11 as illustrated in FIG. 23. In such embodiments, the three-pulse gas generator device 11 is configured to sequentially ignite a first propellant 3, a second propellant 4 and a third propellant 12. The first propellant 3 is ignited by a first igniter device 7. The second propellant 4 is ignited by an igniter charge combustion gas exhaust device 8 feeding combustion gas of igniter charge produced by a second igniter device 9 to the second propellant 4. The third propellant 12 is ignited by feeding combustion gas of igniter charge produced by a third igniter device 13 to the third propellant 12 via a conduit 82 of the igniter charge combustion gas exhaust device 8. The igniter charge combustion gas exhaust device 8 may be configured similarly to the above-described embodiments. A four-or-more pulse gas generator device may be constituted by providing an increased number of pulse units 14.

The above-described embodiments and modification examples are mere examples and may be modified as long as their functionalities are maintained. The configurations presented in the embodiments and the modification examples may be arbitrarily modified and/or combined as long as their functionalities are maintained. For example, a multi-pulse gas generator device 1 may be configured with a combination of the configuration of the barrier membrane 5 according to any of the embodiments and the configuration of the igniter charge combustion gas exhaust device 8 according to any of the embodiments. For example, a multi-pulse gas generator device 1 may be configured with the combination of the igniter charge combustion gas exhaust device 8 illustrated in FIG. 6 and the barrier membrane 5 illustrated in FIG. 16. The igniter charge combustion gas exhaust device 8 may be configured with the combination of the shape of the conduit 82 according to any of the embodiments and the configuration of the exhaust holes 81 according to any of the embodiments. For example, the igniter charge combustion gas exhaust device 8 may be configured with the combination of the configuration of the exhaust holes 81 illustrated in FIG. 9 and the configuration of the conduit 82 illustrated in FIG. 12 or with the combination of the configuration of the exhaust holes 81 illustrated in FIG. 10 and the configuration of the conduit 82 illustrated in FIG. 14A and FIG. 14B.

Multi-pulse gas generator devices set forth in the above-described embodiments are represented, for example, as follows.

In a first aspect, a multi-pulse gas generator device includes a pressure vessel, a barrier membrane, a first propellant, a second propellant, an igniter device, and an igniter charge combustion gas exhaust device. The barrier membrane is configured to separate the first propellant and the second propellant. The igniter device is configured to produce combustion gas of igniter charge to ignite the second propellant. The igniter charge combustion gas exhaust device is configured to exhaust the produced combustion gas of the igniter charge against the second propellant. The barrier membrane includes: a plurality of concavely-deformable portions configured to be concavely deformed by a pressure caused by combustion gas of the second propellant and/or the combustion gas of the igniter charge; and a plurality of convexly-deformable portions configured to be convexly deformed by the pressure caused by the combustion gas of the second propellant and/or the combustion gas of the igniter charge. The flow rate of the combustion gas of the igniter charge exhausted against a portion of the second propellant located outside of one of the plurality of concavely-deformable portions is larger than the flow rate of the combustion gas of the igniter charge exhausted against a portion of the second propellant located outside of one of the plurality of convexly-deformable portions.

Since the flow rate of the combustion gas of the igniter charge exhausted against the portion of the second propellant located outside of one concavely-deformable portion is larger than the flow rate of the combustion gas of the igniter charge exhausted against the portion of the second propellant located outside of one convexly-deformable portion, the concavely-deformable portion is deformed and buckled in a concave shape and the convexly-deformable portion deformed and buckled in a convex shape. As such, by controlling the deformation and buckling of the barrier membrane, the combustion gas of the second propellant can be stably supplied.

In a second aspect, the multi-pulse gas generator device in the first aspect is configured such that the at least one exhaust hole includes a plurality of exhaust holes circumferentially disposed to surround an outer side of the barrier membrane.

In a third aspect, the multi-pulse gas generator device in the second aspect is configured such that the plurality of exhaust holes includes: first exhaust holes through which the combustion gas of the igniter charge is exhausted against the portion of the second propellant located outside of the one of the plurality of concavely-deformable portions; and second exhaust holes through which the combustion gas of the igniter charge is exhausted against the portion of the second propellant located outside of the one of the plurality of convexly-deformable portions. The sum of hole areas of the first exhaust holes is larger than a sum of hole areas of the second exhaust holes.

In a fourth aspect, the multi-pulse gas generator device in the second aspect is configured such that the plurality of exhaust holes includes: first exhaust holes through which the combustion gas of the igniter charge is exhausted against the portion of the second propellant located outside of the one of the plurality of concavely-deformable portions; and second exhaust holes through which the combustion gas of the igniter charge is exhausted against the portion of the second propellant located outside of the one of the plurality of convexly-deformable portion. The number of the first exhaust holes is larger than the second exhaust holes.

Due to this configuration, the flow rate of the combustion gas of the igniter charge exhausted by the exhaust holes disposed near the one of the plurality of concavely-deformable portions is larger than that of the combustion gas of the igniter charge exhausted by the exhaust holes disposed near the one of the plurality of convexly-deformable portions. This may allow controlling the deformation and buckling of the barrier membrane.

In a fifth aspect, the multi-pulse gas generator device in the second aspect is configured such that the at least one exhaust hole includes a first exhaust hole and a second exhaust hole. The angle between the exhaust direction in which the first exhaust hole is configured to exhaust the combustion gas of the igniter charge and the side face of a tubular portion of the barrier membrane is larger than the angle between the exhaust direction in which the second exhaust hole is configured to exhaust the combustion gas of the igniter charge and the side face of the tubular portion of the barrier membrane.

By using this configuration, the pressure exerted on the barrier membrane by the combustion gas of the igniter charge exhausted by the exhaust hole disposed near the one of the concavely-deformable portions is larger than the pressure exerted on the barrier membrane by the combustion gas of the igniter charge exhausted by the exhaust hole disposed near the one of the convexly-deformable portions. This may provide control of the deformation and buckling of the barrier membrane.

In a sixth aspect, the multi-pulse gas generator device in the second aspect is configured such that the one of the plurality of convexly-deformable portions is located between adjacent two of the plurality of exhaust holes in a circumferential direction defined along a side face of a tubular portion of the barrier membrane.

By using this configuration, the flow rate of the combustion gas of the igniter charge exhausted by the exhaust holes disposed near the one of the plurality of concavely-deformable portions is larger than that of the combustion gas of the igniter charge exhausted by the exhaust holes disposed near the one of the plurality of convexly-deformable portions. This may provide control of the deformation and buckling of the barrier membrane.

In a seventh aspect, the multi-pulse gas generator device in the first aspect is configured such that the at least one exhaust hole includes a ring-shaped exhaust hole configured to surround the barrier membrane. The igniter charge combustion gas exhaust device further includes an exhaust resistance element configured to protrude from a wall surface of the ring-shaped exhaust hole, the exhaust resistance element extending in a circumferential direction defined along a side face of a tubular portion of the barrier membrane and located at a location corresponding to at least part of the one of the plurality of convexly-deformable portions.

In an eighth aspect, the multi-pulse gas generator device in the seventh aspect is configured such that the exhaust resistance element fills the ring-shaped exhaust hole in a first direction orthogonal to a reference axis of the tubular portion of the barrier membrane.

Due to this configuration, the flow rate of the combustion gas of the igniter charge exhausted by the exhaust holes disposed near the one of the plurality of concavely-deformable portions is larger than that of the combustion gas of the igniter charge exhausted by the exhaust holes disposed near the one of the plurality of convexly-deformable portions. This may provide control of the deformation and buckling of the barrier membrane.

In a ninth aspect, the multi-pulse gas generator device in the first aspect is configured such that the igniter charge combustion gas exhaust device includes a conduit having an inlet port into which the combustion gas of the igniter charge comes from the igniter device. The inlet port is located at a location corresponding to the one of the plurality of concavely-deformable portions in a circumferential direction defined along a side face of a tubular portion of the barrier membrane.

In a tenth aspect, the multi-pulse gas generator device in the ninth aspect is configured such that the igniter charge combustion gas exhaust device includes a flow resistance element located in the conduit between the inlet port and a location corresponding to the one of the plurality of convexly-deformable portions in the circumferential direction, where the flow resistance element is configured to reduce the flow rate of the combustion gas of the igniter charge that passes therethrough.

Due to this configuration, the flow rate of the combustion gas of the igniter charge exhausted by the exhaust holes disposed near the one of the plurality of concavely-deformable portions is larger than that of the combustion gas of the igniter charge exhausted by the exhaust holes disposed near the one of the plurality of convexly-deformable portions. This may provide control of the deformation and buckling of the barrier membrane.

In an eleventh aspect, the multi-pulse gas generator device in the first aspect is configured such that the rigidity of the one of the plurality of convexly-deformable portions is higher than the rigidity of the one of the plurality of concavely-deformable portions.

In a twelfth aspect, the multi-pulse gas generator device in the eleventh aspect is configured such that the one of the plurality of convexly-deformable portions comprises a reinforcing portion that extends in a direction of a reference axis of a tubular portion of the barrier membrane.

In a thirteenth aspect, the multi-pulse gas generator device in the twelfth aspect is configured such that the ratio of reinforcing fibers directed in the direction of the reference axis to the total reinforcing fibers in the reinforcing portion is larger than that in a remaining portion of the barrier membrane other than the reinforcing portion.

In a fourteenth aspect, the multi-pulse gas generator device in the eleventh aspect is configured such that the one of the plurality of concavely-deformable portions comprises a weakened portion that has a thickness thinner than a remaining portion of the one of the plurality of concavely-deformable portions.

Due to this configuration, the rigidity of the one of the plurality of convexly-deformable portions is higher than the rigidity of the one of the plurality of concavely-deformable portions. This may provide control of the deformation and buckling of the barrier membrane.

Multi-pulse gas generator devices set forth in the above-described embodiments are represented, for example, as follows.

In a fifteenth aspect, a multi-pulse gas generator device includes a pressure vessel, a barrier membrane, a first propellant, a second propellant, an igniter device, and an igniter charge combustion gas exhaust device. The second propellant is disposed outside of the barrier membrane. The igniter device is configured to produce combustion gas of igniter charge to ignite the second propellant. The igniter charge combustion gas exhaust device is configured to exhaust the produced combustion gas of the igniter charge against the second propellant. The barrier membrane includes: a plurality of concavely-deformable portions configured to be concavely deformed by a pressure caused by combustion gas of the second propellant and/or the combustion gas of the igniter charge; and a plurality of convexly-deformable portions configured to be convexly deformed by the pressure caused by the combustion gas of the second propellant and/or the combustion gas of the igniter charge. The rigidity of the plurality of convexly-deformable portions is higher than the rigidity of the plurality of concavely-deformable portions Due to this configuration, the rigidity of the one of the plurality of convexly-deformable portions is higher than the rigidity of the one of the plurality of concavely-deformable portions. This may provide control of the deformation and buckling of the barrier membrane.

What is claimed is:
1. A multi-pulse gas generator device, comprising:
   a pressure vessel;
   a first propellant disposed in the pressure vessel;
   a second propellant disposed in the pressure vessel;
   a barrier membrane configured to separate the first propellant and the second propellant;

an igniter device configured to produce combustion gas of igniter charge to ignite the second propellant; and an igniter charge combustion gas exhaust device comprising at least one exhaust hole configured to exhaust the produced combustion gas of the igniter charge against the second propellant, wherein the barrier membrane comprises:
a plurality of concavely-deformable portions configured to be concavely deformed by a pressure caused by combustion gas of the second propellant and/or the combustion gas of the igniter charge; and
a plurality of convexly-deformable portions configured to be convexly deformed by the pressure caused by the combustion gas of the second propellant and/or the combustion gas of the igniter charge, and wherein a flow rate of the combustion gas of the igniter charge exhausted against a portion of the second propellant located outside of one of the plurality of concavely-deformable portions is larger than a flow rate of the combustion gas of the igniter charge exhausted against a portion of the second propellant located outside of one of the plurality of convexly-deformable portions.

2. The multi-pulse gas generator device according to claim 1, wherein the at least one exhaust hole includes a plurality of exhaust holes circumferentially disposed to surround an outer side of the barrier membrane.

3. The multi-pulse gas generator device according to claim 2, wherein the plurality of exhaust holes comprises:
first exhaust holes through which the combustion gas of the igniter charge is exhausted against the portion of the second propellant located outside of the one of the plurality of concavely-deformable portions; and
second exhaust holes through which the combustion gas of the igniter charge is exhausted against the portion of the second propellant located outside of the one of the plurality of convexly-deformable portions, and
wherein a sum of hole areas of the first exhaust holes is larger than a sum of hole areas of the second exhaust holes.

4. The multi-pulse gas generator device according to claim 2, wherein the plurality of exhaust holes includes:
first exhaust holes through which the combustion gas of the igniter charge is exhausted against the portion of the second propellant located outside of the one of the plurality of concavely-deformable portions; and
second exhaust holes through which the combustion gas of the igniter charge is exhausted against the portion of the second propellant located outside of the one of the plurality of convexly-deformable portions, and
wherein the number of the first exhaust holes is larger than the number of the second exhaust holes.

5. The multi-pulse gas generator device according to claim 2,
wherein the plurality of exhaust holes comprises:
a first exhaust hole configured to exhaust the combustion gas of the igniter charge against the portion of the second propellant located outside of the one of the plurality of concavely-deformable portions; and
a second exhaust hole configured to exhaust the combustion gas of the igniter charge against the portion of the second propellant located outside of the one of the plurality of convexly-deformable portions, and
wherein an angle between an exhaust direction in which the first exhaust hole is configured to exhaust the combustion gas of the igniter charge and a side face of a tubular portion of the barrier membrane is larger than an angle between an exhaust direction in which the second exhaust hole is configured to exhaust the combustion gas of the igniter charge and the side face of the tubular portion of the barrier membrane.

6. The multi-pulse gas generator device according to claim 2, wherein the one of the plurality of convexly-deformable portions is located between adjacent two of the plurality of exhaust holes in a circumferential direction defined along a side face of a tubular portion of the barrier membrane.

7. The multi-pulse gas generator device according to claim 1, wherein the at least one exhaust hole comprises a ring-shaped exhaust hole configured to surround the barrier membrane, and
wherein the igniter charge combustion gas exhaust device further comprises an exhaust resistance element configured to protrude from a wall surface of the ring-shaped exhaust hole, the exhaust resistance element extending in a circumferential direction defined along a side face of a tubular portion of the barrier membrane to be located at a location corresponding to at least part of the one of the plurality of convexly-deformable portions.

8. The multi-pulse gas generator device according to claim 7, wherein the exhaust resistance element is configured to fill at least part of the ring-shaped exhaust hole in a first direction orthogonal to a reference axis of the tubular portion of the barrier membrane.

9. The multi-pulse gas generator device according to claim 1, wherein the igniter charge combustion gas exhaust device comprises a conduit having an inlet port into which the combustion gas of the igniter charge comes from the igniter device,
wherein the conduit is configured to connect the inlet port and the at least one exhaust hole, and
wherein the inlet port is located at a location corresponding to the one of the plurality of concavely-deformable portions in a circumferential direction defined along a side face of a tubular portion of the barrier membrane.

10. The multi-pulse gas generator device according to claim 9, wherein the igniter charge combustion gas exhaust device comprises a flow resistance element located in the conduit between the inlet port and a location corresponding to the one of the plurality of convexly-deformable portions in the circumferential direction, the flow resistance element being configured to reduce a flow rate of the combustion gas of the igniter charge passing through the flow resistance element.

11. The multi-pulse gas generator device according to claim 1, wherein a rigidity of the one of the plurality of convexly-deformable portions is higher than a rigidity of the one of the plurality of concavely-deformable portions.

12. The multi-pulse gas generator device according to claim 11, wherein the one of the plurality of convexly-deformable portions comprises a reinforcing portion that extends in a direction of a reference axis of a tubular portion of the barrier membrane.

13. The multi-pulse gas generator device according to claim 12, wherein the barrier membrane is formed of elastomer containing reinforcing fibers, and
wherein a ratio of reinforcing fibers directed in the direction of the reference axis to total reinforcing fibers in the reinforcing portion is larger than that in a remaining portion of the barrier membrane other than the reinforcing portion.

14. The multi-pulse gas generator device according to claim 11, wherein the one of the plurality of concavely-deformable portions comprises a weakened portion that has a thickness thinner than a remaining portion of the one of the plurality of concavely-deformable portions.

15. A multi-pulse gas generator device, comprising:
a pressure vessel;
a first propellant disposed in the pressure vessel;
a second propellant disposed in the pressure vessel;
a barrier membrane configured to separate the first propellant and the second propellant;
an igniter device configured to produce combustion gas of igniter charge to ignite the second propellant; and
an igniter charge combustion gas exhaust device configured to exhaust the produced combustion gas of the igniter charge against the second propellant,
wherein the barrier membrane comprises:
a plurality of concavely-deformable portions configured to be concavely deformed by a pressure caused by combustion gas of the second propellant or the combustion gas of the igniter charge; and
a plurality of convexly-deformable portions configured to be convexly deformed by the pressure caused by the combustion gas of the second propellant or the combustion gas of the igniter charge, and
wherein a plurality of reinforcing portions are provided at locations corresponding to the plurality of convexly-deformable portions, or a plurality of weakened portions are provided at locations corresponding to the plurality of concavely-deformable portions.

16. The multi-pulse gas generator device according to claim 15, wherein the plurality of reinforcing portions or the plurality of weakened portions extend in a direction that extends along the barrier membrane and that is orthogonal to a direction extending from a first convexly-deformable portion of the plurality of convexly-deformable portion to a first concavely-deformable portion of the plurality of concavely-deformable portions, the first convexly-deformable portion and the first concavely-deformable portion being adjacent to each other.

17. The multi-pulse gas generator device according to claim 15, wherein a plurality of reinforcing members are provided at the locations corresponding to the plurality of convexly-deformable portions as the plurality of reinforcing portions.

18. The multi-pulse gas generator device according to claim 15, wherein a plurality of protruding portions are provided at the locations corresponding to the plurality of convexly-deformable portions as the plurality of reinforcing portions.

19. The multi-pulse gas generator device according to claim 15, wherein the plurality of weakened portions are provided at the locations corresponding to the plurality of concavely-deformable portions, and the plurality of weakened portions have a thickness that is thinner than that of the plurality of convexly-deformable portions.

20. The multi-pulse gas generator device according to claim 15, wherein the barrier membrane is formed of elastomer containing reinforcing fibers,
wherein the plurality of reinforcing portions are provided at the locations corresponding to the plurality of convexly-deformable portions, and
wherein a ratio of reinforcing fibers directed in a first direction in the plurality of reinforcing portions is higher than in the plurality of concavely-deformable portions, the first direction extending along the barrier membrane, the first direction being orthogonal to a direction extending from a first convexly-deformable portion of the plurality of convexly-deformable portions to a first concavely-deformable portion of the plurality of concavely-deformable portions, the first convexly-deformable portion and the first concavely-deformable portion being adjacent to each other.

* * * * *